(12) United States Patent
Barron et al.

(10) Patent No.: US 6,875,114 B2
(45) Date of Patent: Apr. 5, 2005

(54) TAPERED COUPLING

(75) Inventors: Richard J. Barron, Ann Arbor, MI (US); Harry A. Hunnicutt, Ann Arbor, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 10/394,307

(22) Filed: Mar. 21, 2003

(65) Prior Publication Data

US 2004/0185944 A1 Sep. 23, 2004

(51) Int. Cl.[7] .............................. F16C 3/00; F16D 1/06
(52) U.S. Cl. ...................... 464/179; 464/904; 403/314; 403/409.1
(58) Field of Search ............................... 403/304, 314, 403/367, 409.1, 904, 293, 298, 302; 464/149, 153, 154, 137, 138, 105, 98, 93, 88, 179, 904

(56) References Cited

U.S. PATENT DOCUMENTS

| | | | | |
|---|---|---|---|---|
| 1,316,011 A | * | 9/1919 | Bailey et al. | 464/105 |
| 1,429,980 A | | 9/1922 | Spangler | 464/16 |
| 3,243,973 A | * | 4/1966 | Kraeling | 464/154 X |
| 3,279,216 A | * | 10/1966 | Spaulding, Jr. | 464/154 |
| 3,438,221 A | * | 4/1969 | Paulsen | 464/104 X |
| 4,993,992 A | | 2/1991 | Kriegel | 464/137 |
| 5,911,630 A | * | 6/1999 | Shigeura | 464/154 |
| 2003/0180163 A1 | | 9/2003 | Hartmann et al. | 417/360 |

FOREIGN PATENT DOCUMENTS

| | | | | |
|---|---|---|---|---|
| DE | 420070 | * | 10/1925 | 464/105 |
| NL | 30873 | * | 9/1933 | 464/154 |
| NL | 30879 | | 9/1933 | |

OTHER PUBLICATIONS

Grainger®, "Flexible Couplings And Spiders", No. 388 1997 Catalog, Cover and pp. 370–371.
Guardian Industries, Inc., Products List, http://www.guardiancouplings.com/products.htm, printed Jun. 16, 2003.
Guardian Industries. Inc., "Gear Grip Flexible Shafts Couplings", http://www.guardiancouplings.com/gg99.htm, printed Jun. 13, 2003.
Guardian Industires, Inc., "Taper Grid Coupling ", http://www.guardiancouplings.com/TG99.HTM, printed Jul. 23, 2002.
Guardian Industries, Inc., "Series "M" Flexible Shaft Drive Couplings"; http://www.guardiancouplings.com/gd98.htm, printed Jun. 16, 2003.
Guardian Industries, Inc., "Flexible Curved Jaw Couplings", http://www.guardiancouplings.com/jw98.htm, printed Jun. 13, 2003.
Guardian Industries, Inc., "Zero Backlash Motion Control Couplings", http://www.guardiancouplings.com/MC99.HTM, printed Jun. 13, 2003.
Guardian Industries, Inc., "Stainless Steel Bellows Couplings", http://www.guardiancouplings.com/BELLOWS.HTM, printed Jun. 16, 2003.
Guardian Industries, Inc., "Flexible Membrane Couplings"; http://www.guardiancouplings.com/MEMBRANE.HTM, printed Jun. 16, 2003.
Guardian Industries, Inc., "Oldham Couplings"; http://www.guardiancouplings.com/OLDHAM.HTM, printed Jun. 16, 2003.
Guardian Industries, Inc., "Universal/Lateral Couplings"; http://www.guardiancouplings.com/UNIVALT.HTM, printed Jun. 16, 2003.
Guardian Industries, Inc., "Muliti–Beam Couplings"; http://www.guardiancouplings.com/MLTIBEAM.HTM, printed Jun. 16, 2003.
Guardian Industries, Inc., "Variable Durometer Jaw Couplings"; http://www.guardiancouplings.com/JAWTYPE.HTM, printed Jun. 16, 2003.
I–TEC Corporation, "ASA Oldham Type Coupling, ASJ17–8–8", ASA Catalogue, Mar. 2002, Letter and 2 pages.
U.S. Appl. No. 10/393,740, filed Mar. 3, 2003, Barron et al.

* cited by examiner

*Primary Examiner*—Kenn Thompson
(74) *Attorney, Agent, or Firm*—MacMillan, Sobanski & Todd, LLC

(57) ABSTRACT

A coupling having slots for receiving drive tabs of an associated driving shaft and a driven shaft, wherein the tabs of the driving shaft and the driven shaft are tapered to militate against rotational play between the driving shaft and the driven shaft which results in undesirable wear and damage to the drive shafts and coupling.

25 Claims, 15 Drawing Sheets

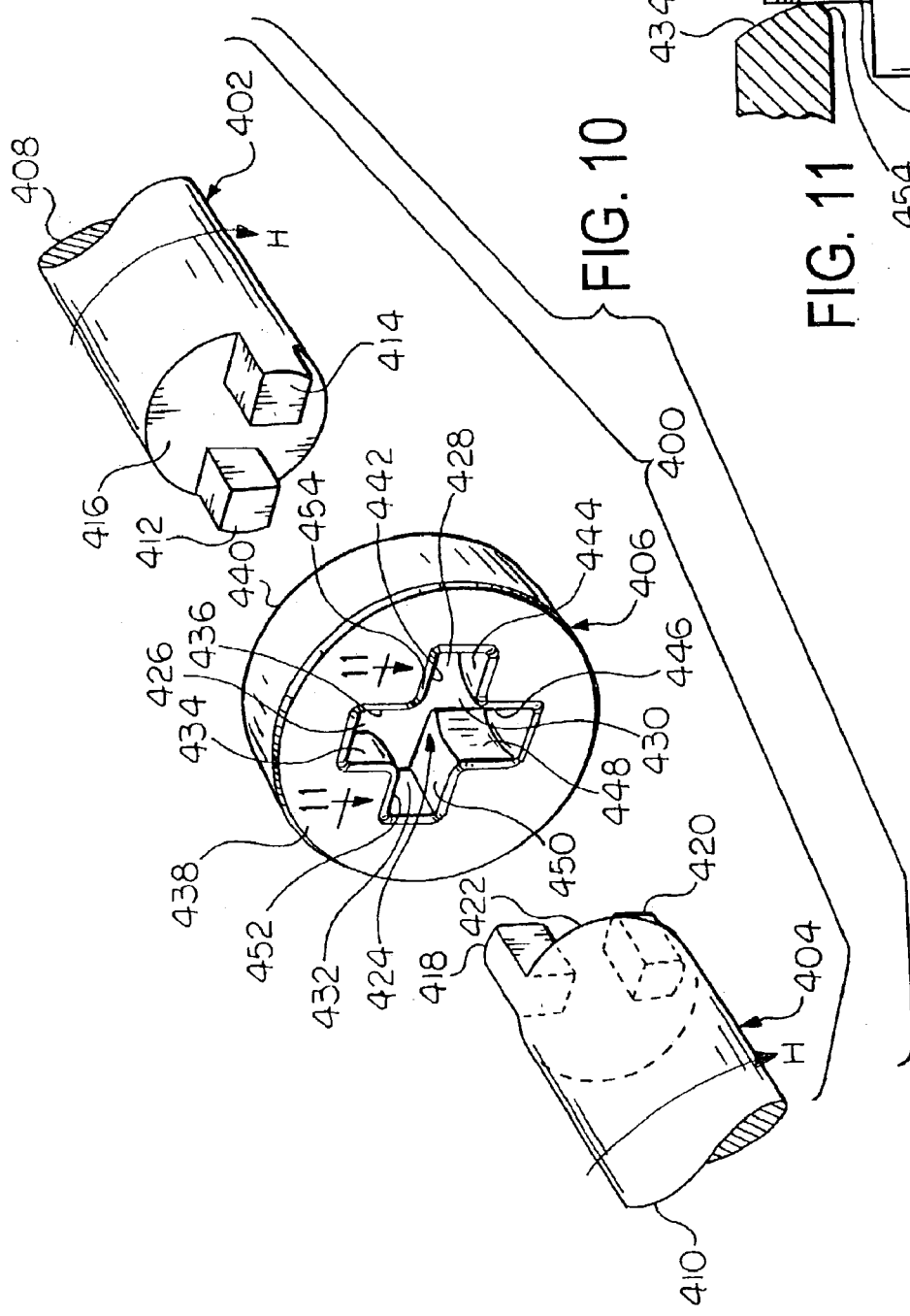
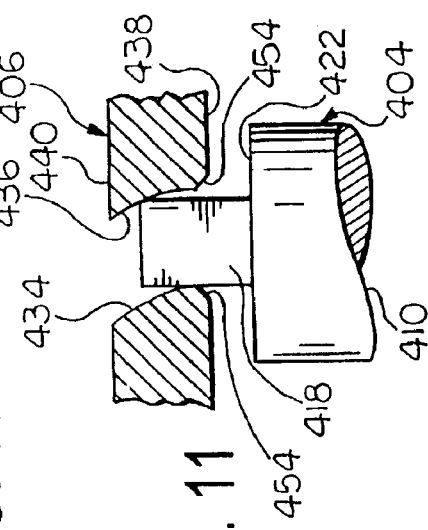
FIG. 10
FIG. 11

US 6,875,114 B2

1

TAPERED COUPLING

FIELD OF THE INVENTION

The invention relates to a coupling and more particularly to a coupling having slots for receiving drive tabs of an associated driving shaft and a driven shaft, wherein the tabs of the driving shaft and the driven shaft are tapered to militate against rotational play between the driving shaft and the driven shaft.

BACKGROUND OF THE INVENTION

Couplings are known in the art for interconnecting a rotatable driving shaft and a rotatable driven shaft. The driving shaft is typically driven by a prime mover or motor, and the driven shaft is connected to and drives a rotatable machine or load such as a pump or compressor, for example. Rotation of the driving shaft causes a corresponding rotation of the driven shaft via the coupling. The coupling allows for slight misalignment of the driving and driven shafts such as radial offsets, angular misalignments of the axes of the shafts, or both.

One such coupling is the "insert (3-jaw) type", such as that manufactured by Boston Gear, in which each coupling half (coupling body) has three axially extending jaws spaced about the circumference of a respective plate-like end flange. A spider with six radially outwardly extending legs is disposed between the coupling halves, and the couplings are axially positioned so that the each jaw of one coupling half is disposed between two jaws of the other coupling half, and separated from each of the two jaws of the other coupling half by a respective one of the spider legs. The spider is typically made of a material which is relatively softer than that of which the coupling halves are made. It is known to make the spiders of oil-impregnated bronze, synthetic rubber, polyurethane, urethane, and co-polymer thermoplastic elastomers. When one of the coupling halves is rotated, torque is transmitted from each of the jaws of the driven coupling half, through an adjacent one of the spider legs to the adjacent jaw of the other coupling half, thereby causing rotation of the other coupling half. Because the jaws and spider surfaces are flat, axially oriented surfaces, this arrangement allows for a certain amount of rotational play and backlash.

Other couplings currently known in the art often permit this undesirable rotational play or backlash between the driving shaft and the driven shaft. The rotational play can result in undesirable wear and damage to the shafts and the couplings. Additionally, undesirable noise and vibration to the load or prime mover can result.

Manufacturers have attempted to control rotational play using couplings of two types. One type includes elastomeric coupling elements which deform to form a close fit to the driving shaft and the driven shaft (similar to the "insert (3-jaw) type"). The inclusion of the elastomeric coupling elements may prevent the coupling from being used under certain environmental conditions. Another type requires some form of fastening to the driving and driven members to eliminate relative motion, thereby causing an undesirable increase in production costs.

It would be desirable to produce a coupling which militates against rotational play between the driving shaft and the driven shaft.

SUMMARY OF THE INVENTION

Consistent and consonant with the present invention, a coupling which militates against rotational play between the driving shaft and the driven shaft has been developed.

2

The coupling comprises:

a driving shaft having a first end and a second end, the first end adapted to be driven by a prime mover and the second end having a pair of tabs extending axially outwardly therefrom;

a driven shaft having a first end and a second end, the first end adapted for connection to a rotating machine and the second end having a pair of tabs extending axially outwardly therefrom;

a coupling main body having a central aperture formed therein, the aperture adapted to receive the tabs of the driving shaft and the tabs of the driven shaft in opposing sides thereof to transfer rotation from the driving shaft to the driven shaft, wherein at least one side of the tabs of the driving shaft is tapered and at least one side of the tabs of the driven shaft is tapered; and a bearing system adapted to urge the driving shaft and the driven shaft towards one another and resist reaction forces generated during rotation of the driving shaft and the driven shaft to maintain engagement between the driving shaft, the driven shaft, and the coupling main body.

DESCRIPTION OF THE DRAWINGS

Various objects and advantages of this invention will become apparent to those skilled in the art from the following detailed description of the preferred embodiment, when read in light of the accompanying drawings, in which:

FIG. 10 is an exploded perspective view of an eighth embodiment of the coupling in accordance with the present invention including a driving shaft and a driven shaft, the coupling having helical inner walls;

FIG. 11 is a partial cross-sectional view of the coupling of FIG. 10 taken along line 11—11 and shown assembled;

DESCRIPTION OF THE PREFERRED EMBODIMENT

Figure 1:
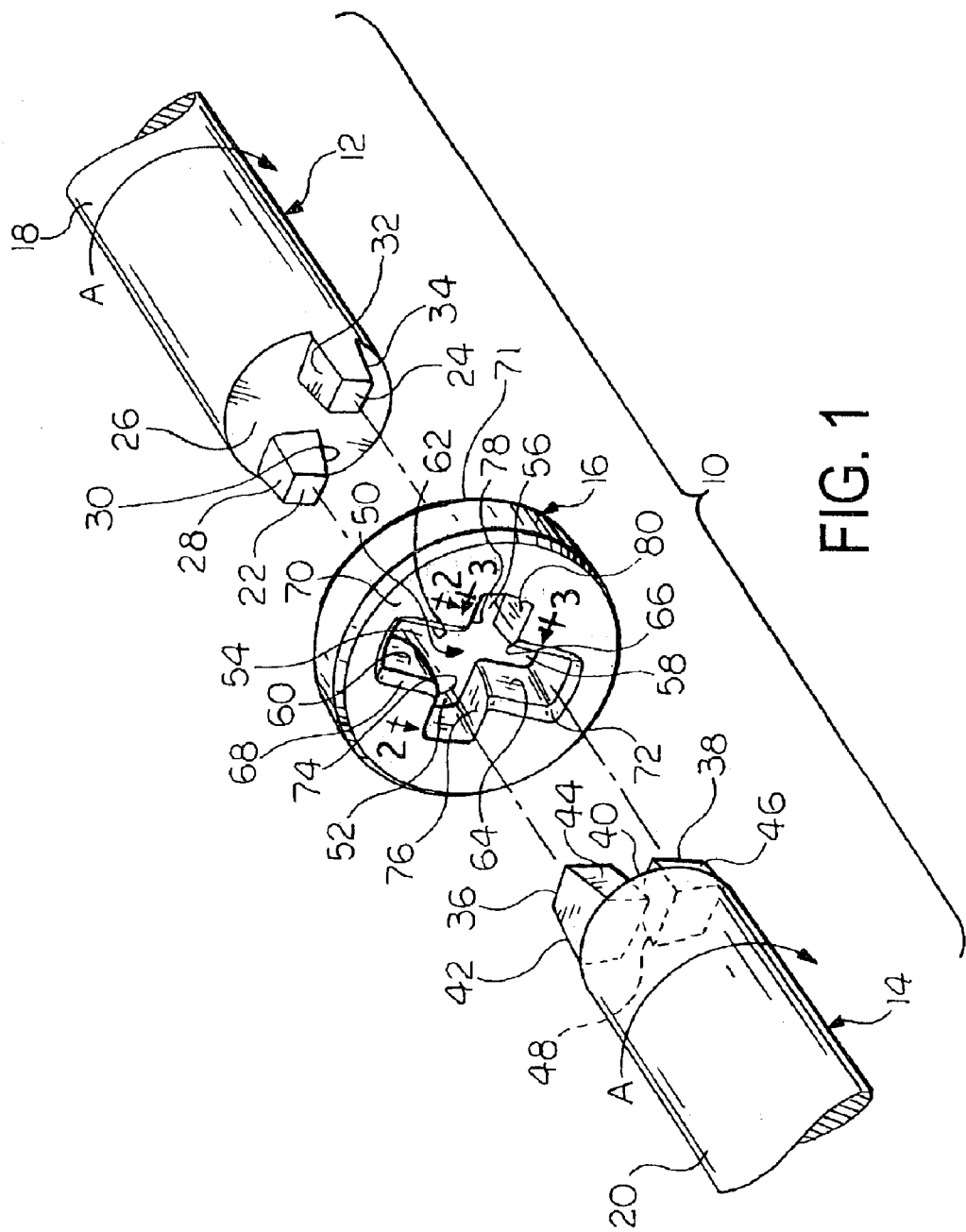
FIG. 1 is an exploded perspective view of a first embodiment of the coupling in accordance with the present invention including a driving shaft and a driven shaft, wherein both the driving shaft and the driven shaft include axially extending tabs having tapered sides.

Referring now to the drawings, and particularly FIG. 1, there is shown generally at 10 a shaft coupling assembly incorporating the features of the invention. The shaft coupling assembly 10 includes a driving shaft 12, a driven shaft 14, and a coupling main body 16. A direction of rotation 'A' is shown for both the driving shaft 12 and the driven shaft 14. A first end 18 of the driving shaft 12 is drivingly engaged with a prime mover PM, shown schematically in FIG. 17, such as a motor, for example. A first end 20 of the driven shaft 14 is drivingly engaged with a rotatable machine RM, shown schematically in FIG. 17, such as a pump or compressor, for example.

A pair of diametrically opposed tabs 22, 24 extend axially outwardly from a second end 26 of the driving shaft 12. At least one side 28, 30 of the tab 22 and at least one side 32, 34 of the tab 24 are tapered to narrow the width of each of the tabs 22, 24 when moving axially away from the second end 26 towards the driven shaft 14. In the embodiment shown, both of the sides 28, 30 and both of the sides 32, 34 are tapered. Where only one side of each of the tabs 22, 24 of the driving shaft 12 is tapered, the sides 30, 32 facing away from the direction of rotation 'A' are preferably tapered. Desirable results are achieved with a taper in the range of 1 degree to 20 degrees from a longitudinal axis of the driving shaft 12, with even more desirable results obtained using a taper of 5 degrees. In an exemplary application of the invention embodied as a motor and pump unit for an electrohydraulic brake system for a passenger automobile, it was calculated that forming shafts with a taper in such a range, and most optimally a taper of 5 degrees, required the least preload that was achievable with manageable tolerancing for acceptably priced manufacturing processes.

A pair of diametrically opposed tabs 36, 38 extend axially outwardly from a second end 40 of the driven shaft 14. At least one side 42, 44 of the tab 36 and at least one side 46, 48 of the tab 38 are tapered to narrow the width of each of the tabs 36, 38 when moving axially away from the second end 40 towards the driving shaft 12. In the embodiment shown, both of the sides 42, 44 and both of the sides 46, 48 are tapered. Where only one side of each of the tabs 36, 38 of the driven shaft 14 is tapered, the sides 44, 48 facing away from the direction of rotation 'A' are preferably tapered. Desirable results are achieved with a taper in the range of 1 degree to 20 degrees from a longitudinal axis of the driven shaft 14, with even more desirable results obtained using a taper of 5 degrees. As indicated above, such a taper is small enough such that torque will not overcome the axial preload and drive the shafts apart, and large enough to allow easily achievable manufacturing tolerances on mating parts. The tabs 22, 24 of the driving shaft 12 are offset ninety degrees from the tabs 36, 38 of the driven shaft 14 in the embodiment shown. It is understood that tabs having different offset angles could be used without departing from the scope and spirit of the invention.

Figure 2:
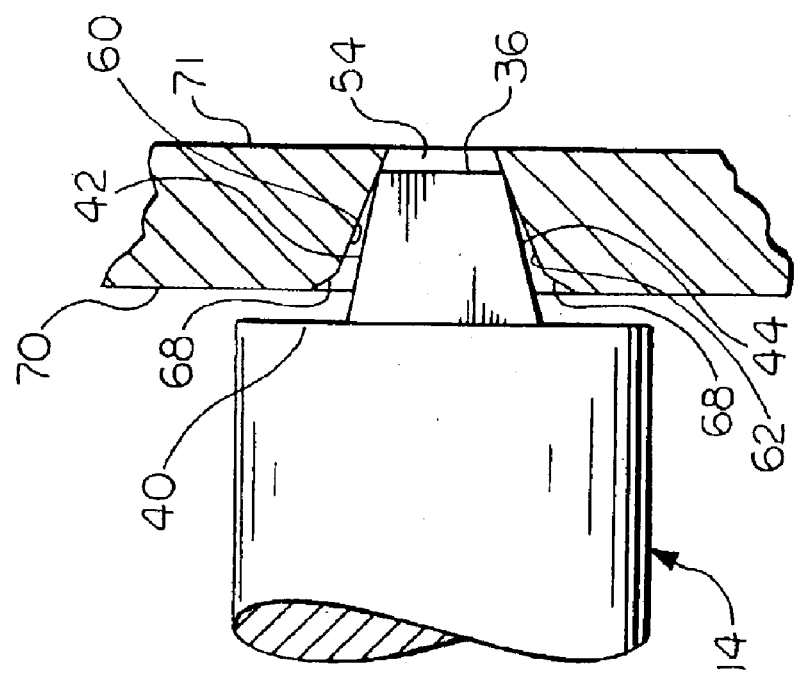
FIG. 2 is a partial cross-sectional view of the coupling of FIG. 1 taken along line 2—2 and shown assembled.

The coupling main body 16 includes a central aperture 50 having four outwardly extending lobes 52, 54, 56, 58 forming a cross-shaped aperture. The lobes 54, 58 are adapted to receive the tabs 36, 38, respectively. In the embodiment shown, side walls 60, 62 forming the lobe 54 and side walls 64, 66 forming the lobe 58 are sloped such that contact with the tabs 36, 38 is linear, as clearly shown in FIG. 3. Additionally, the linear contact is preferably made along a line closer to a second surface 71 than a first surface 70. It is understood that other contact configurations could be used without departing from the scope and spirit of the invention. For example, the entire surface of the side walls 60, 62 may contact the entire surface of the sides 42, 44 of the tab 36, respectively, and the entire surface of the sides 64, 66 may contact the entire surface of the sides 46, 48 of the tab 38, respectively. As clearly illustrated in FIGS. 1 and 2, a bevel 68 surrounds the lobe 54 adjacent the first surface 70 of the coupling main body 16. Additionally, a bevel 72 surrounds the lobe 58 adjacent the first surface 70.

The lobes 52, 56 are adapted to receive the tabs 22, 24, respectively. In the embodiment shown, side walls 74, 76 forming the lobe 52 and side walls 78, 80 forming the lobe 56 are sloped such that contact with the tabs 22, 24 is linear, as clearly shown in FIG. 2. Additionally, the linear contact is preferably made along a line closer to the first surface 70 than the second surface 71. It is understood that other contact configurations could be used without departing from the scope and spirit of the invention. For example, the entire surface of the side walls 74, 76 may contact the entire surface of the sides 28, 30 of the tab 22, respectively, and the entire surface of the sides 78, 80 may contact the entire surface of the sides 32, 34 of the tab 24, respectively.

Figure 3:
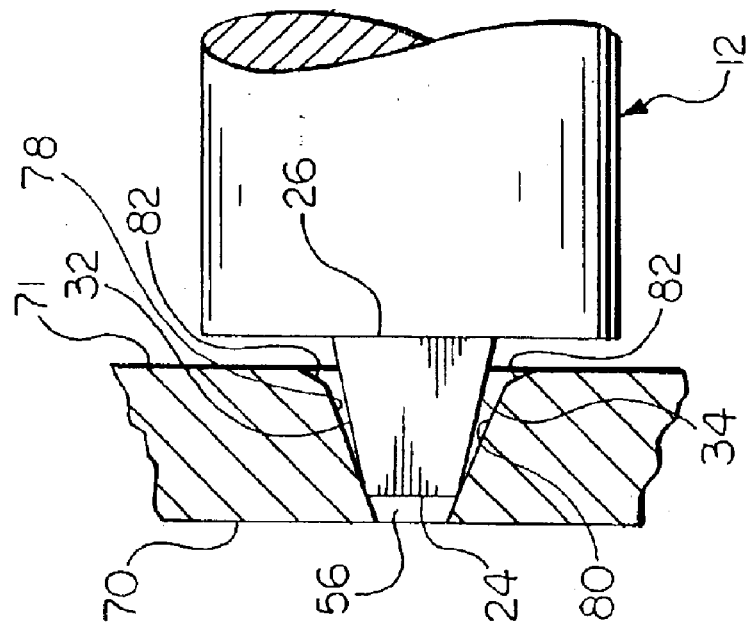
FIG. 3 is a partial cross-sectional view of the coupling of FIG. 1 taken along line 3—3 and shown assembled.

A bevel (not shown) surrounds the lobe 52 adjacent the second surface 71 of the coupling main body 16. A bevel 82 surrounds the lobe 56 adjacent the second surface 71 of the coupling main body 16, as shown in FIG. 3.

In the embodiment shown, a distance from an outer edge of the tab 22 to an outer edge of the tab 24 of the driving shaft 12 differs from a distance from an outer edge of the tab 36 to an outer edge of the tab 38 of the driven shaft 14. The difference militates against improper insertion of the tabs 22, 24, 36, 38 into the coupling main body 16. The tabs 36, 38 also have a different cross sectional area than the tabs 22, 24 so they cannot be inserted in the lobes 52, 56.

To assemble, the tabs 22, 24 of the driving shaft 12 are inserted into the lobes 52, 56, respectfully. The bevel (not shown) and the bevel 82 guide the tabs 22, 24 into the lobes 52, 56, respectively. The tabs 36, 38 of the driven shaft 14 are inserted into the lobes 54, 58, respectfully. The bevels 68, 72 guide the tabs 36, 38 into the lobes 54, 58, respectively. The tapers ensure that the tabs 22, 24, 36, 38 can only be inserted in the larger opening side of the respective mating lobe 52, 56, 54, 58 in the coupling main body 16.

Figure 17:
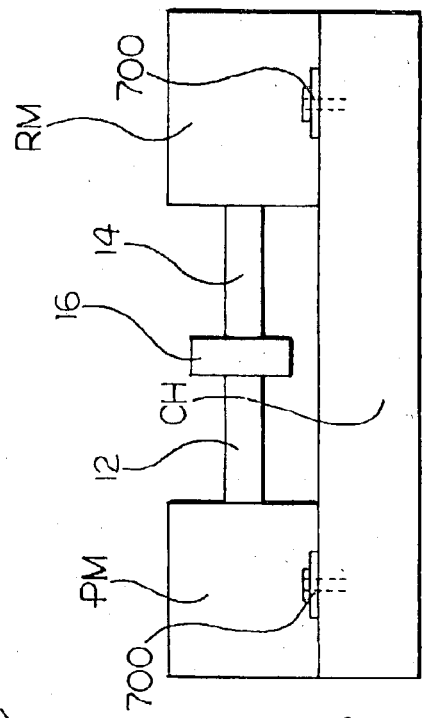
FIG. 17 is a schematic view of a bearing assembly in accordance with the present invention.

Referring now to FIG. 17, a system utilizing the shafts 12, 14 and coupling main body 16 is schematically shown. The prime mover PM is provided which drives the driving shaft 12. A bearing system 700 is provided for the prime mover PM to transmit axial forces to and from a chassis CH. In the schematic illustration, the bearing system 700 could be, for example, a flange formed on the prime mover PM and a bolt fastening the flange to the chassis CH. However, as will be readily recognized by one of ordinary skill in the art, there are various suitable bearing systems well known in the art for transmitting forces between objects. Such bearing systems may involve fasteners such as bolts which militate against relative movement between components, and systems which permit some relative movement between components while still transmitting forces. Any suitable one of these bearing systems could be used.

Also illustrated in FIG. 17 is a rotatable machine RM, which is caused to rotate by the driven shaft 14. The rotatable machine RM is provided with a respective suitable bearing system 700 to transmit forces between the rotatable machine RM and the chassis CH. It should be understood that the bearing system 700 associated with the rotatable machine RM may be different in design and function from the bearing system 700 associated with the prime mover PM.

For the sake of ease of schematic illustration, the prime mover PM and the rotatable machine RM are illustrated as being operatively connected by respective bearing systems to a separate chassis CH. However, it should be clearly understood that in many instances the prime mover PM and the rotatable machine RM may be directly operatively connected by a shared bearing system (not shown). For example, the prime mover PM and the rotatable machine RM may be bolted to one another.

Figure 18:
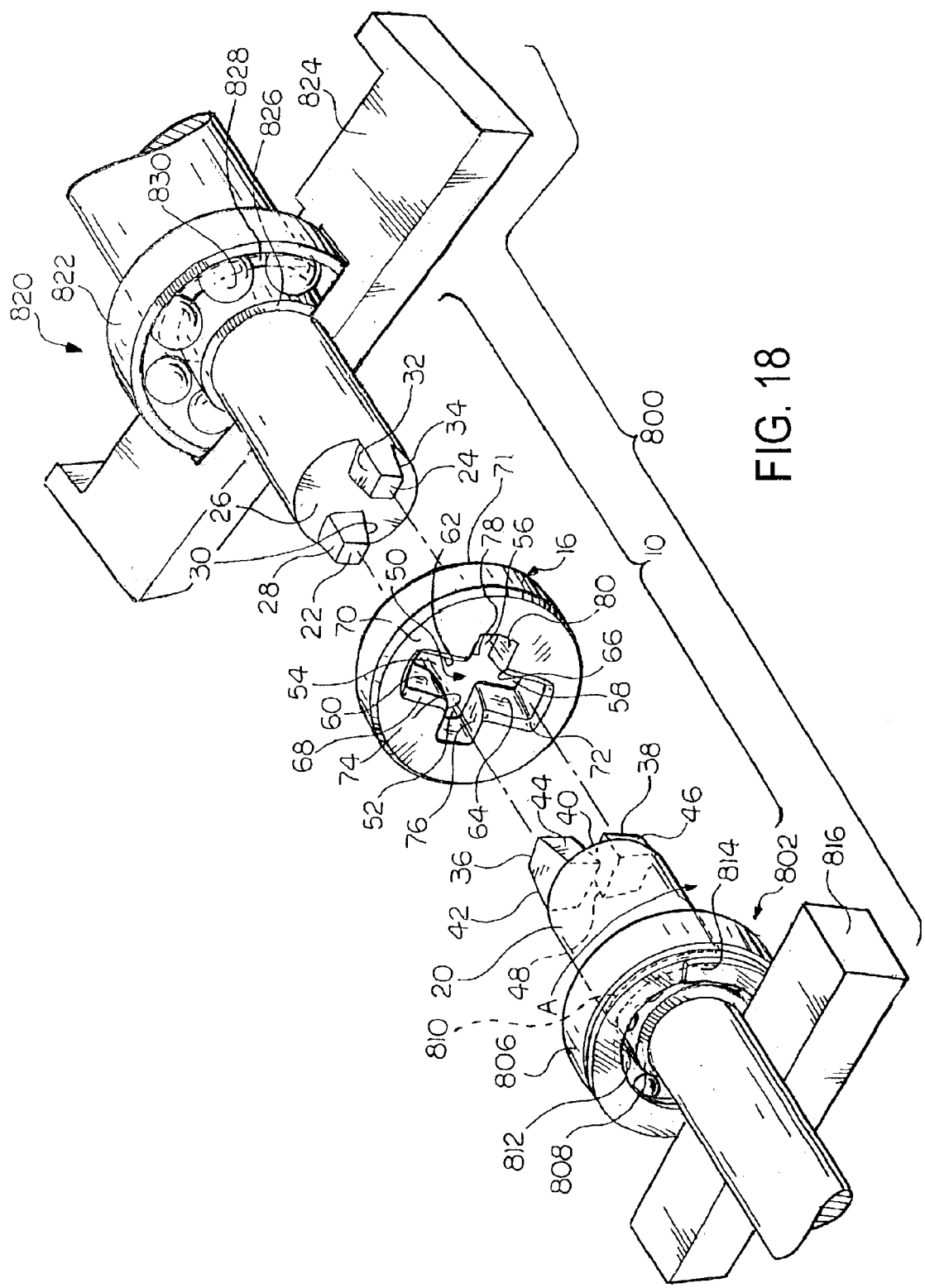
FIG. 18 is a perspective view of a second embodiment of a bearing assembly in accordance with the present invention showing a driving shaft end, a coupling, and a driven shaft end exploded, and the bearing assembly shown schematically.

Referring now to FIG. 18, there is shown a second embodiment of a shaft and bearing system 800. The shaft and bearing system 800 includes a shaft coupling assembly 10 as illustrated in FIG. 1 and previously described herein. A preloaded bearing 802 is disposed on the driven shaft 14 which permits movement of the bearing 802 in a direction along the axis of the driven shaft 14. The bearing 802 includes an outer race 806 and an inner race 808. The inner race 808 of the bearing 802 abuts a step 810 formed in an outer surface of the driven shaft 14. A plurality of balls 812 is disposed between the inner race 808 and the outer race 806 of the bearing 802 to permit rotational movement therebetween. A spring 814 abuts the outer race 806 of the bearing 802 to urge the bearing 802 and the driven shaft 14 towards engagement with the coupling main body 16 and the driving shaft 12. The spring 814 also abuts and is held in place by a wall or restricting frame 816. The inner race 808 abuts the step 810 on the driven shaft 14 to cause the driven shaft 14 to be urged towards the coupling main body 16 and the driving shaft 12 due to urging of the preload bearing 802 by the spring 814.

The driving shaft 12 has a bearing 820 disposed thereon. An outer race 822 of the bearing 820 is restrained from axial movement in respect of the driving shaft 12 by a wall or restricting frame 824. An inner race 826 of the bearing 820 abuts a step 828 formed in an outer surface of the driving shaft 12. A plurality of balls 830 is disposed between the inner race 826 and the outer race 822 of the bearing 820 to permit rotational movement therebetween. Thus, the driving shaft 12 and the bearing 820 are restricted from movement axially by the cooperation of the wall 824 and the step 828. As the components of the shaft coupling assembly 10 wear during use, the spring 814 urges the driven shaft 14, the coupling main body 16, and the driving shaft 12 into snug engagement, thereby compensating for the wear.

Additionally, it should be understood that other bearing systems could be used without departing from the scope and spirit of the invention. Although a ball-type bearing has been described, it is understood that any conventional bearing system where one bearing is preloaded by a spring and one bearing is capable of receiving an axial thrust load can be used. In the types of bearing systems described herein, some relative movement between the components is permitted to compensate for wear on the components of the shaft coupling assembly 10.

In operation, the driving shaft 12 is caused to rotate by the prime mover PM, which causes the coupling main body 16, the driven shaft 14, and the rotatable machine RM to rotate. The tapered sides 28, 30, 32, 34 of the driving shaft 12 and the tapered sides 42, 44, 46, 48 of the driven shaft 14 militate against rotational play between the driving shaft 12, the driven shaft 14, and the coupling main body 16.

Interaction of the tapered sides 28, 30, 32, 34 of the driving shaft 12 and the tapered sides 42, 44, 46, 48 of the driven shaft 14 with the associated facing surfaces of the coupling main body 16 does develop reaction forces tending to drive the driving shaft 12 away from the driven shaft 14. If not resisted, these reaction forces could cause the driving shaft 12 to uncouple from the driven shaft 14. These reaction forces are, in the first instance, resisted by friction developed between the tapered side 28 or the tapered side 30, and the tapered side 32 or the tapered side 34 of the driving shaft 12, the tapered side 42 or the tapered side 44, and the tapered side 46 or the tapered side 48 of the driven shaft 14, and the respective side wall 74 or the side wall 76, the side wall 78 or the side wall 80, the side wall 60 or the side wall 62, and the side wall 66 or the side wall 64, of the coupling main body 16 (the exact surfaces developing friction depending on whether the direction of rotation is in the direction 'A' or counter to the direction 'A'). Additionally, the reaction forces developed during operation tending to drive the driven shaft 14 (and the interconnected rotatable machine RM) away from the driving shaft 12 (and the interconnected prime mover PM) are resisted by the bearing systems 700 transmitting these forces to the chassis CH, which militate against the prime mover PM from being caused to move away from the rotatable machine RM.

If no chassis CH is provided, and the prime mover PM is directly coupled to the rotatable machine RM by a bearing system 700, the bearing system 700 would militate against the prime mover PM being caused to move away from the rotatable machine RM. Thus, militating against the driving shaft 12 being caused to move axially away from the driven shaft 14.

Furthermore, as will be discussed below with respect to other embodiments, a spring or other device may also be provided to provide a preload force which urges the driving shaft 12 and the driven shaft 14 into engagement. Such a preload may be introduced as part of the shaft and bearing system 800.

When compared to conventional non-tapered coupling assemblies, the shaft coupling assembly 10 of the present invention facilitates a relaxation of manufacturing tolerances for the tabs 22, 24, 36, 38 and the lobes 52, 54, 56, 58 of the coupling main body 16. The tapers also militate against backlashes during slowdown or stopping of the motor, and oscillating torque load from the prime mover PM.

As previously discussed, the side walls 74, 76 forming the lobe 52 and side walls 78, 80 forming the lobe 56 are sloped such that contact with the tabs 22, 24 is linear and the side walls 60, 62 forming the lobe 54 and side walls 64, 66 forming the lobe 58 are sloped such that contact with the tabs 36, 38 is linear. Additionally, the linear contact on the side walls 74, 76, 78, 80 is preferably made along a line closer to the first surface 70 than the second surface 71 and the linear contact on the side walls 60, 62, 64, 66 is preferably made along a line closer to the second surface 71 than the first surface 70. Rotational stability is facilitated by having the contact points disposed in this manner.

Although any conventional production process can be used, it is preferred to produce the coupling main body 16 using metal injection molding. Conventional powdered metal manufacturing methods are not well suited for forming the opposing tapers. Metal injection molding also achieves higher density when compared to powdered metal. The driving shaft 12 and the driven shaft 14 can be produced by any conventional production process such as machining (milling, grinding, broaching, etc.), forging, or cold heading for example.

The shaft coupling assembly 10 of the current embodiment presents several advantages. The shaft coupling assembly 10 is easy to assemble. Having the tabs 22, 24, 36, 38 and the lobes 52, 54, 56, 58 such that they can only be assembled one way militates against misassembly. Additionally, the shaft coupling assembly 10 is a free slide-in assembly that does not require a fastening operation of coupling elements to the driving shaft 12 and the driven shaft 14. The prime mover PM can be freely moved into and out of the operating position without performing an additional operation on the coupling elements. Other "zero backlash" couplings having only metal components require a fastening to the driving shaft 12 and the driven shaft 14.

Figure 4:
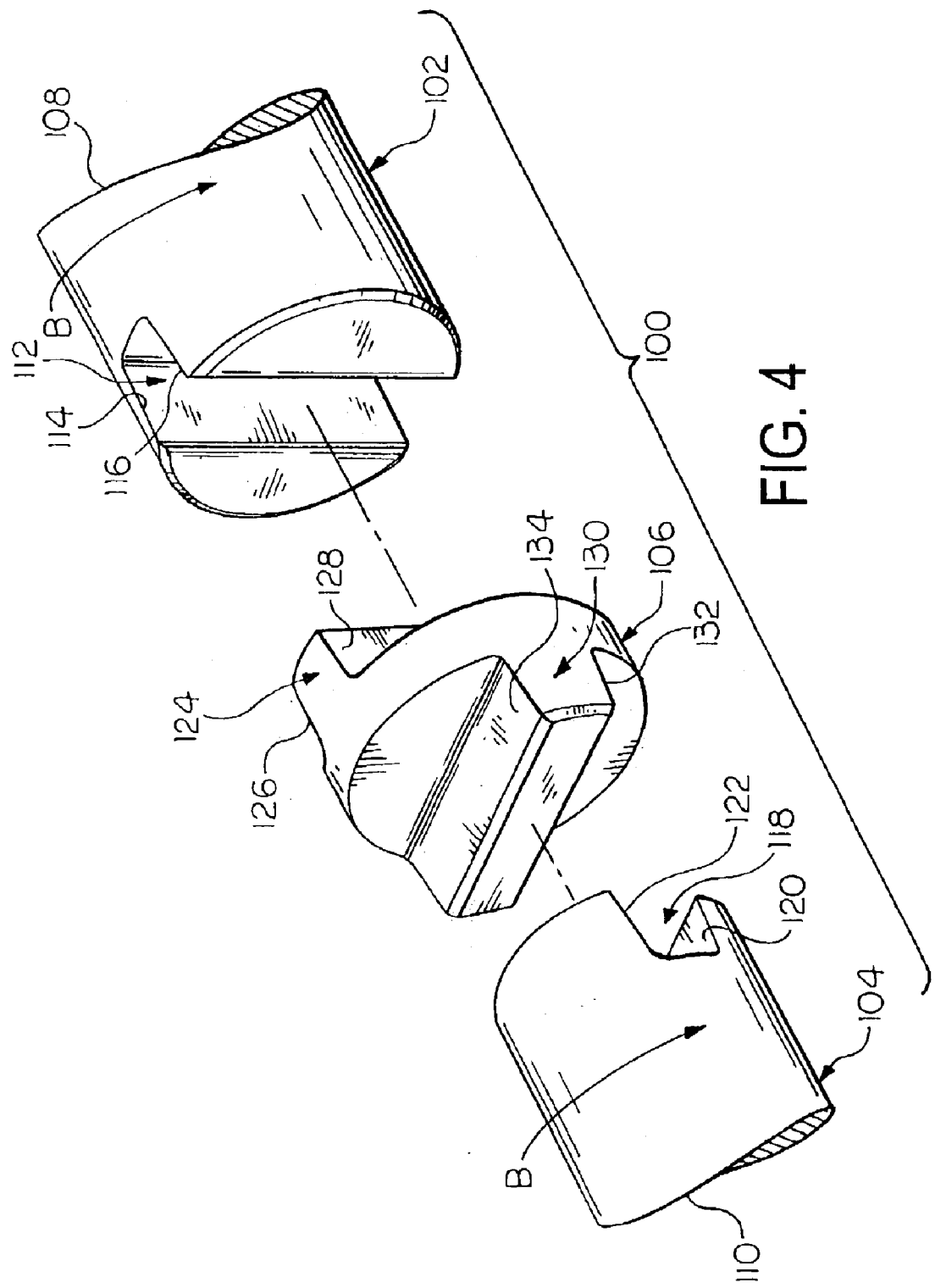
FIG. 4 is an exploded perspective view of a second embodiment of the coupling in accordance with the present invention including a driving shaft and a driven shaft, wherein the coupling includes axially extending tabs having tapered sides and mating slots on the shafts.

Referring now to FIG. 4, there is shown a second embodiment of a shaft coupling assembly 100. The shaft coupling assembly 100 includes a driving shaft 102, a driven shaft 104, and a coupling main body 106. A direction of rotation 'B' is shown for both the driving shaft 102 and the driven shaft 104. A first end 108 of the driving shaft 102 is drivingly engaged with a prime mover (not shown) such as a motor, for example. A first end 110 of the driven shaft 104 is drivingly engaged with a rotatable machine (not shown) such as a pump or compressor, for example.

The driving shaft 102 includes a slot 112 formed transversely to a longitudinal axis of the driving shaft 102. The slot 112 has tapered sides 114, 116. A slot 118 is formed in the driven shaft 104 with tapered sides 120, 122.

The coupling main body 106 includes a first tab 124 formed on one end which extends axially outwardly therefrom and is adapted to be received in the slot 112. The first tab 124 has tapered side walls 126, 128. A second tab 130 is formed on the opposite end of the coupling main body 106 from the first tab 124. The second tab 130 extends axially outwardly from the coupling main body 106 and has tapered side walls 132, 134. The second tab 130 is adapted to be received in the slot 118.

To assemble, the first tab 124 is inserted into the slot 112 and the second tab 130 is inserted into the slot 118. In operation, the driving shaft 102 is caused to rotate by the prime mover, which causes the coupling main body 106, the driven shaft 104, and the rotatable machine to rotate. The tapered sides 114, 116 of the slot 112 cooperate with the side walls 126, 128 of the first tab 124 and the tapered sides 120, 122 of the slot 118 cooperate with the side walls 132, 134 of the second tab 130 to militate against rotational play between the driving shaft 102, the driven shaft 104, and the coupling main body 106, given a small axial force preloading the shafts together.

When compared to conventional non-tapered coupling assemblies, the shaft coupling assembly 100 of the present invention facilitates a relaxation of manufacturing tolerances for the first tab 124, the second tab 130, the slot 112, and the slot 118. The tapered surfaces also militate against backlashes during slowdown or stopping of the motor, and oscillating torque load from the prime mover.

Although any conventional production process can be used, it is preferred to produce the coupling main body 106 using metal injection molding. Conventional powdered metal manufacturing methods are not well suited for forming the opposing tapers. Metal injection molding also achieves a higher density when compared to powdered metal. The driving shaft 102 and the driven shaft 104 can be produced by any conventional production process such as machining (milling, grinding, broaching etc.), forging, cold heading, and for example.

Figure 5:
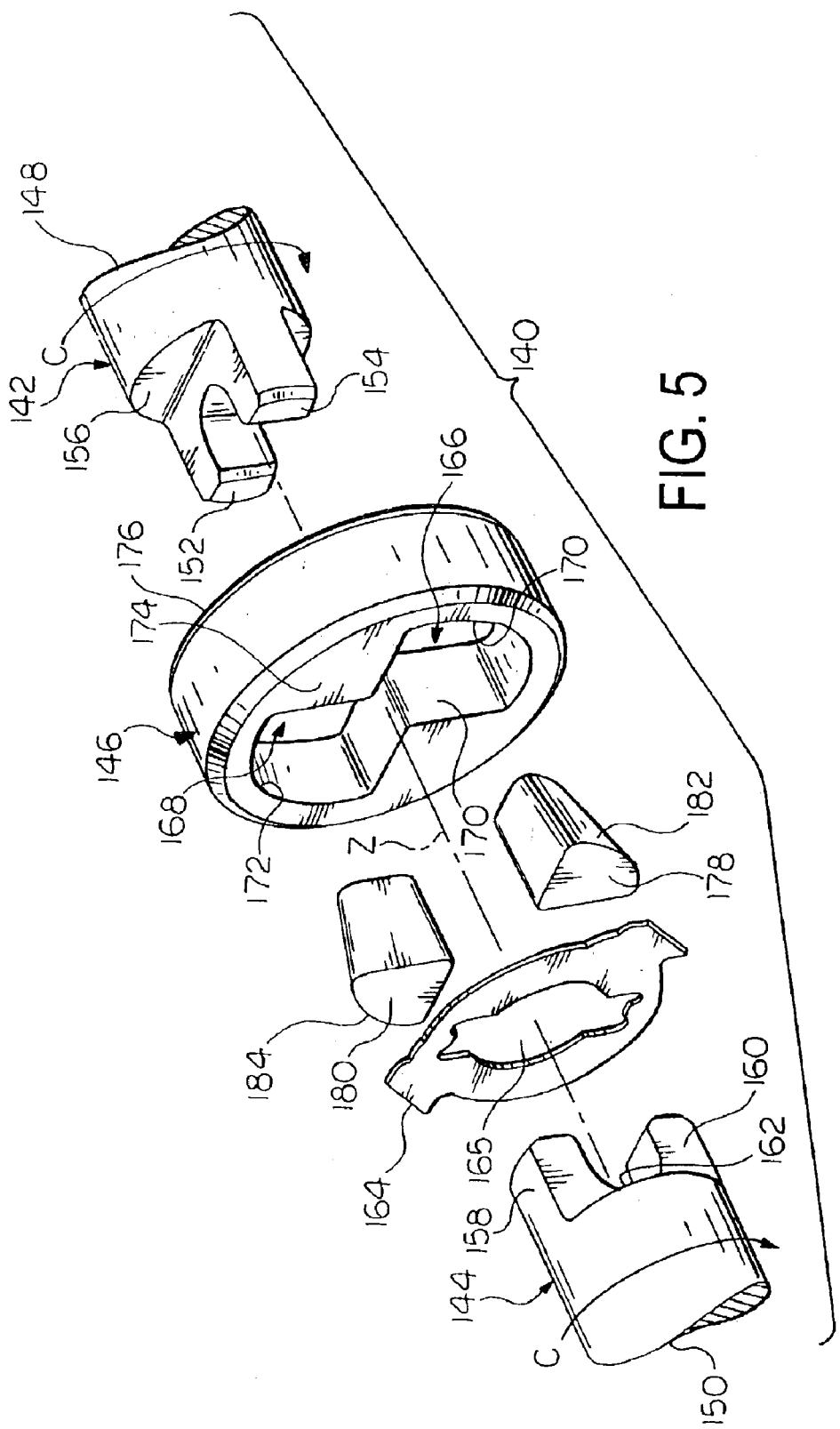
FIG. 5 is an exploded perspective view of a third embodiment of the coupling in accordance with the present invention including a driving shaft and a driven shaft, the coupling including a pair of tapered wedges therein, preloaded axially by a spring member.

Referring now to FIG. 5, there is shown a third embodiment of a shaft coupling assembly 140. The shaft coupling assembly 140 includes a driving shaft 142, a driven shaft 144, and a coupling main body 146. A direction of rotation 'C' is shown for both the driving shaft 142 and the driven shaft 144. A first end 148 of the driving shaft 142 is drivingly engaged with a prime mover (not shown) such as a motor, for example. A first end 150 of the driven shaft 144 is drivingly engaged with a rotatable machine (not shown) such as a pump or compressor, for example. It is understood that the rotation direction and drive versus driven load can be interchanged at any time.

A pair of diametrically opposed tabs 152, 154 extend axially outwardly from a second end 156 of the driving shaft 142. A pair of diametrically opposed tabs 158, 160 extend axially outwardly from a second end 162 of the driven shaft 144. A spring plate 164 is disposed between the driven shaft 144 and the coupling main body 146. In the illustrated embodiment, one spring plate 164 is shown. It is understood that more than one spring plate 164 could be used without departing from the scope and spirit of the invention. The spring plate 164 has a central aperture 165 formed therein. The tabs 158, 160 of the driven shaft 144 are received in the aperture 165 of the spring plate 164. The tabs 152, 154 of the driving shaft 142 are offset ninety degrees from the tabs 158, 160 of the driven shaft 144 in the embodiment shown. It is understood that tabs having different offset angles could be used without departing from the scope and spirit of the invention.

The coupling main body 146 has an aperture formed therein. The aperture is divided into a first lobe 166 and a second lobe 168. Each lobe 166, 168 has two generally flat surfaces extending radially outwardly from the central portion of the coupling main body 146. The flat portions of the first lobe 166 are joined at a radially outward portion by a curved surface 170. The flat portions of the second lobe 168 are joined at a radially outward portion by a curved surface 172. A central portion of the curved surfaces 170, 172 are tapered from a first side 174 to a second side 176 of the coupling main body 146. In the embodiment shown, the taper of the curved surfaces 170, 172 has a generally conical shape. It is understood that other taper types could be used without departing from the scope and spirit of the invention.

A first wedge 178 and a second wedge 180 are adapted to be received in the first lobe 166 and the second lobe 168, respectively. The first wedge 178 is disposed between the tab 154 of the driving shaft 142 and the tab 160 of the driven shaft 144. The second wedge 180 is disposed between the tab 152 of the driving shaft 142 and the tab 158 of the driven shaft 144. The first wedge 178 has a pair of flat surfaces to abut the tabs 154, 160. The second wedge 180 has a pair of flat surfaces to abut the tabs 152, 158. A curved outer surface 182 of the first wedge 178 is adapted to be received by the curved surface 170 of the coupling main body 146. A curved outer surface 184 of the second wedge 180 is adapted to be received by the curved surface 172 of the coupling main body 146. The curved outer surfaces 182, 184 are tapered to generally match the taper of the curved surfaces 170, 172, respectively.

To assemble, the tabs 152, 154 of the driving shaft 142 are inserted into the lobes 168, 166, respectively. The wedges 178, 180 are then placed adjacent the tabs 154, 152, respectively. The tabs 158, 160 of the driving shaft 142 are inserted through the aperture 165 of the spring plate 164, and into the first lobes 168, 166, respectively.

When the shaft coupling assembly 140 is assembled, the spring plate 164 urges the wedges 178, 180 to abut the curved surfaces 170, 172 of the lobes 166, 168. The first wedge 178 is also urged by the spring plate 164 to abut the tabs 154, 160. The second wedge 180 is also urged by the spring plate 164 to abut the tabs 152, 158.

In operation, the driving shaft 142 is caused to rotate by the prime mover, which causes the coupling main body 146, the driven shaft 144, and the rotatable machine to rotate. During rotation, as the torque is increased, the force exerted on the wedges 178, 180 by the tabs 152, 154 causes a reaction force urging the wedges 178, 180 in a direction along the curved surfaces 170, 172, respectively. This force is opposed by a friction force plus the force from the spring plate 164. During assembly, the wedges 178, 180 will move under the action of the spring plate 164 to take up any rotational play. The wedges 178, 180 will also be able to move to compensate for any wear, eliminate play, and militate against backlash during operation. During slowdown or stopping of the driving shaft 142, the urging of the wedges 178, 180 by the spring plate 164 militates against rotational play and backlashes between the driving shaft 142, the driven shaft 144, and the coupling main body 146. The preferred value of axial force from the spring plate 164 would exceed the axial force component trying to cause movement of the wedges 178, 180 for a chosen taper angle, assuming negligible friction as might occur with a greased or low friction coupling moving constantly to accommodate shaft misalignment.

Figure 6:
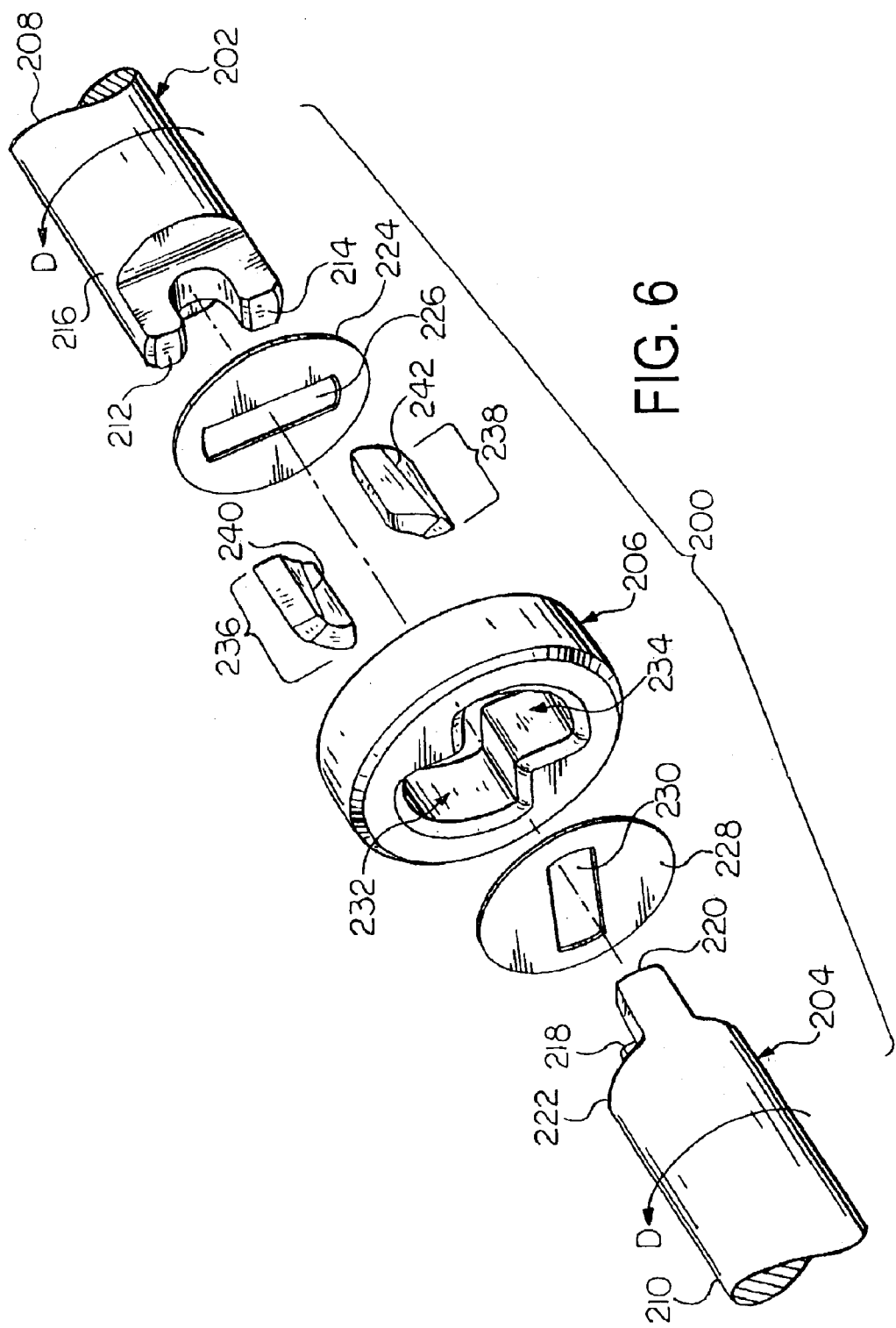
FIG. 6 is an exploded perspective view of a fourth embodiment of the coupling in accordance with the present invention including a driving shaft and a driven shaft, the coupling including two pairs of tapered wedges therein and one or more flexing plates preloading the wedges into the main body.

Referring now to FIG. 6, there is shown a fourth embodiment of a shaft coupling assembly 200. The shaft coupling assembly 200 includes a driving shaft 202, a driven shaft 204, and a coupling main body 206. A direction of rotation 'D' is shown for both the driving shaft 202 and the driven shaft 204. A first end 208 of the driving shaft 202 is drivingly engaged with a prime mover (not shown) such as a motor, for example. A first end 210 of the driven shaft 204 is drivingly engaged with a rotatable machine (not shown) such as a pump or compressor, for example. It is understood that the rotation direction and drive versus driven load can be interchanged at any time.

A pair of diametrically opposed tabs 212, 214 extend axially outwardly from a second end 216 of the driving shaft 202. A pair of diametrically opposed tabs 218, 220 extend axially outwardly from a second end 222 of the driven shaft 204. A spring plate 224 is disposed between the driving shaft 202 and the coupling main body 206. An aperture 226 is formed in the spring plate 224 to permit the tabs 212, 214 to extend therethrough. A spring plate 228 is disposed between the driven shaft 204 and the coupling main body 206. An aperture 230 is formed in the spring plate 228 to permit the tabs 218, 220 to extend therethrough. The tabs 212, 214 of the driving shaft 202 are offset ninety degrees from the tabs 218, 220 of the driven shaft 204 in the embodiment shown. It is understood that tabs having different offset angles could be used without departing from the scope and spirit of the invention.

The coupling main body 206 has an aperture formed therein. The aperture is divided into a first lobe 232 and a second lobe 234. A first pair of wedges 236 are adapted to be received in the first lobe 232 of the coupling main body 206 adjacent and between the tab 212 of the driving shaft 202 and the tab 218 of the driven shaft 204. A second pair of wedges 238 are adapted to be received in the second lobe 234 of the coupling main body 206 adjacent and between the tab 214 of the driving shaft 202 and the tab 220 of the of the driven shaft 204. A connecting plane 240 dividing the first pair of wedges 236 is at an angle relative to a longitudinal axis of the driving shaft 202 and the driven shaft 204. Similarly, a connecting plane 242 dividing the second pair of wedges 238 is at an angle relative to the longitudinal axis of the driving shaft 202 and the driven shaft 204.

To assemble, the tabs 212, 214 of the driving shaft 202 are inserted through the aperture 226 of the spring plate 224, and into the first lobe 232 and the second lobe 234, respectively. The first pair of wedges 236 are disposed adjacent the tab 212 in the first lobe 232 of the coupling main body 206. The second pair of wedges 238 are disposed adjacent the tab 214 in the second lobe 234 of the coupling main body 206. The tabs 218, 220 of the driven shaft 204 are inserted through the aperture 230 of the spring plate 228 The tab 218 is inserted into the first lobe 232 of the coupling main body 206 such that the first pair of wedges 236 are disposed between the tab 212 of the driving shaft 202 and the tab 218 of the driven shaft 204. The tab 220 is inserted into the second lobe 234 of the coupling main body 206 such that the second pair of wedges 238 are disposed between the tab 214 of the driving shaft 202 and the tab 220 of the driven shaft 204. The spring plate 224 and the spring plate 228 cooperate to contain the first pair of wedges 236 and the second pair of wedges 238 therebetween, and within the first lobe 232 and the second lobe 234, respectively. When assembled, the spring plate 224 and the spring plate 228 cooperate to urge the first pair of wedges 236 to abut the tabs 212, 218 and urge the second pair of wedges 238 to abut the tabs 214, 220.

In operation, the driving shaft 202 is caused to rotate by the prime mover, which causes the coupling main body 206, the driven shaft 204, and the rotatable machine to rotate. During rotation, as the torque is increased, the force exerted on the first pair of wedges 236 by the tab 212 causes a reaction force urging the first pair of wedges 236 in a direction along the connecting plane 240. Similarly, the force exerted on the second pair of wedges 238 by the tab 214 causes a reaction force urging the second pair of wedges 238 to in a direction along the connecting plane 242. The reaction forces are opposed by a friction force plus the force of the spring plates 224, 228. During assembly, the wedges 236, 238 will move under the action of the spring plates 224, 228 to take up any rotational play. The wedges 236, 238 will also be able to move and compensate for any wear, eliminate play, and militate against backlash during operation. The spring plates 224, 228 continue to urge the first pair of wedges 236 and the second pair of wedges 238 towards the position shown in FIG. 6. During slowdown or stopping of the driving shaft 202, the urging of the first pair of wedges 236 and the second pair of wedges 238 by the spring plates 224, 228 militates against rotational play and backlashes between the driving shaft 202, the driven shaft 204, and the coupling main body 206. The preferred value of axial force from the spring plates 224, 228 would exceed the axial force component trying to cause movement of the wedges 236, 238 for a chosen taper angle, assuming negligible friction as might occur with a greased or low friction coupling moving constantly to accommodate shaft misalignment.

Figure 7:
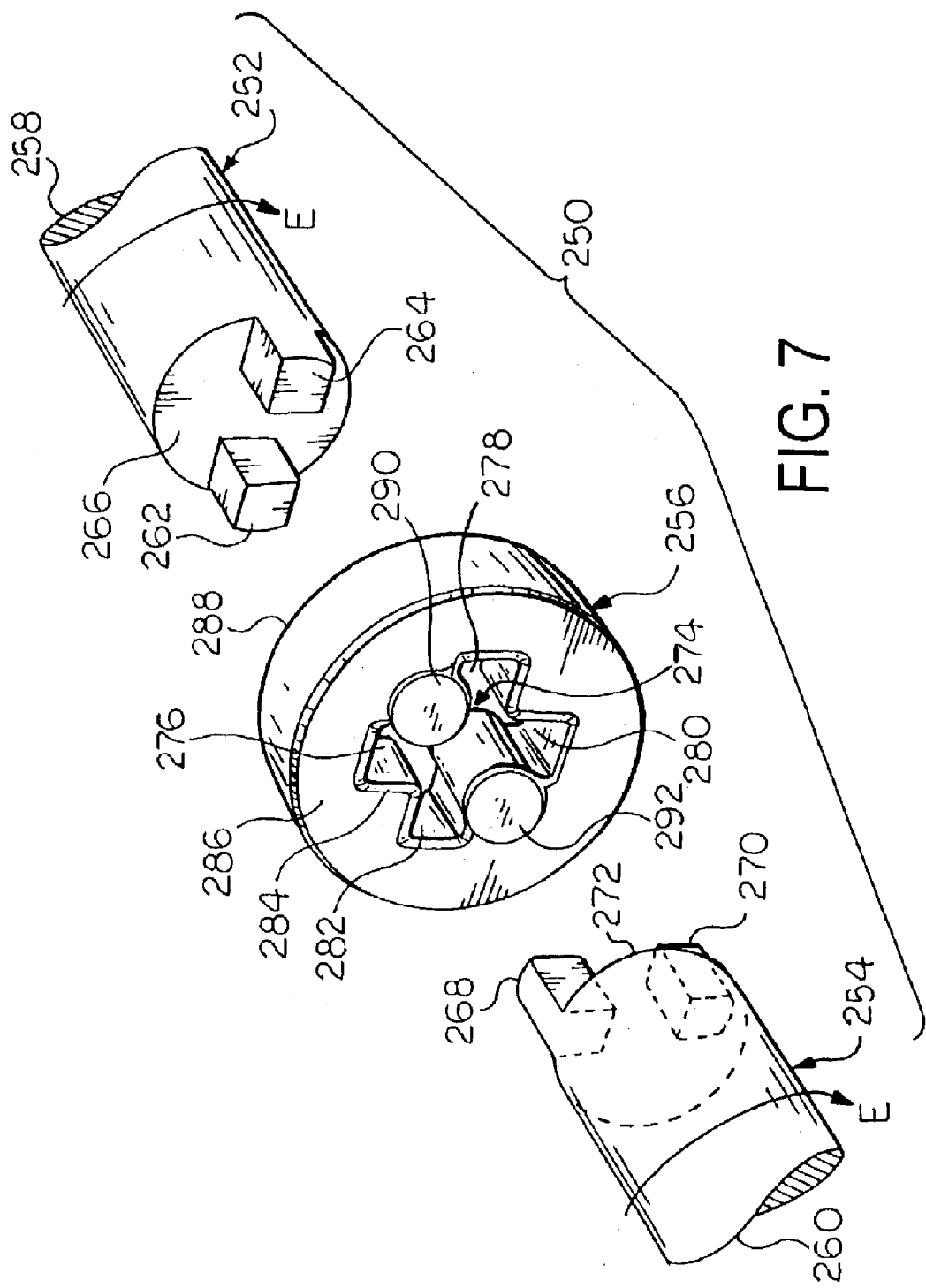
FIG. 7 is an exploded perspective view of a fifth embodiment of the coupling in accordance with the present invention including a driving shaft and a driven shaft, the coupling having cylindrical elastomer inserts with a circular cross-section.

Referring now to FIG. 7, there is shown a fifth embodiment of a shaft coupling assembly 250. The shaft coupling assembly 250 includes a driving shaft 252, a driven shaft 254, and a coupling main body 256. A direction of rotation 'E' is shown for both the driving shaft 252 and the driven shaft 254. A first end 258 of the driving shaft 252 is drivingly engaged with a prime mover (not shown) such as a motor, for example. A first end 260 of the driven shaft 254 is drivingly engaged with a rotatable machine (not shown) such as a pump or compressor, for example.

A pair of diametrically opposed tabs 262, 264 extend axially outwardly from a second end 266 of the driving shaft 252. A pair of diametrically opposed tabs 268, 270 extend axially outwardly from a second end 272 of the driven shaft 254. In the embodiment shown the tabs 262, 264, 268, 270 are rectangular in cross-section. It is understood that tabs having different cross-sectional shapes could be used without departing from the scope and spirit of the invention. The tabs 262, 264 of the driving shaft 252 are offset ninety degrees from the tabs 268, 270 of the driven shaft 254 in the embodiment shown. It is understood that tabs having different offset angles could be used without departing from the scope and spirit of the invention.

The coupling main body 256 includes a central aperture 274 having four outwardly extending lobes 276, 278, 280, 282 forming a cross-shaped aperture. The lobes 278, 282 are adapted to receive the tabs 264, 262, respectively. The lobes 276, 280 are adapted to receive the tabs 268, 270, respectively. A bevel 284 surrounds the lobes 276, 278, 280, 282 adjacent a first surface 286 of the coupling main body 256. Additionally, a bevel (not shown) surrounds the lobes 276, 278, 280, 282 adjacent a second surface 288. A cylindrical insert 290 is disposed between the lobe 276 and the lobe 278. A cylindrical insert 292 is disposed between the lobe 280 and the lobe 282. In the embodiment shown, the inserts 290, 292 have a circular cross-section. It is understood that inserts having different cross-sectional shapes such as elliptical or irregular shapes, for example, can be used without departing from the scope and spirit of the invention. Additionally, the inserts 290, 292 could be disposed between the lobes 278, 280 and the lobes 276, 282, respectively. Although two inserts 290, 292 are shown, it is understood that fewer or more inserts can be used without departing from the scope and spirit of the invention. Preferably, the inserts 290, 292 are produced from an elastomer. However, it is understood that materials having similar mechanical properties can be used.

To assemble, the tabs 262, 264 of the driving shaft 252 are inserted into the lobes 282, 278, respectfully. The bevel surrounding the lobes 276, 278, 280, 282 adjacent the second surface 288 guides the tabs 262, 264 into the lobes 282, 278. The tabs 268, 270 of the driven shaft 254 are inserted into the lobes 276, 280, respectfully. The bevel 284 guides the tabs 268, 270 into the lobes 276, 280.

In operation, the driving shaft 252 is caused to rotate by the prime mover, which causes the coupling main body 256, the driven shaft 254, and the rotatable machine to rotate. The inserts 290, 292 cause the driving shaft 252 and the driven shaft 254 to be preloaded in the non-driven direction against the non elastic coupling main body 256, thereby militating against rotational play between the driving shaft 252, the driven shaft 254, and the coupling main body 256. When compared to conventional coupling assemblies, the shaft coupling assembly 250 of the present invention facilitates a relaxation of manufacturing tolerances for the tabs 262, 264, 268, 270 and the lobes 276, 278, 280, 282 of the coupling main body 256. The inserts 290, 292 also militate against backlashes during slowdown or stopping of the motor.

Figure 8:
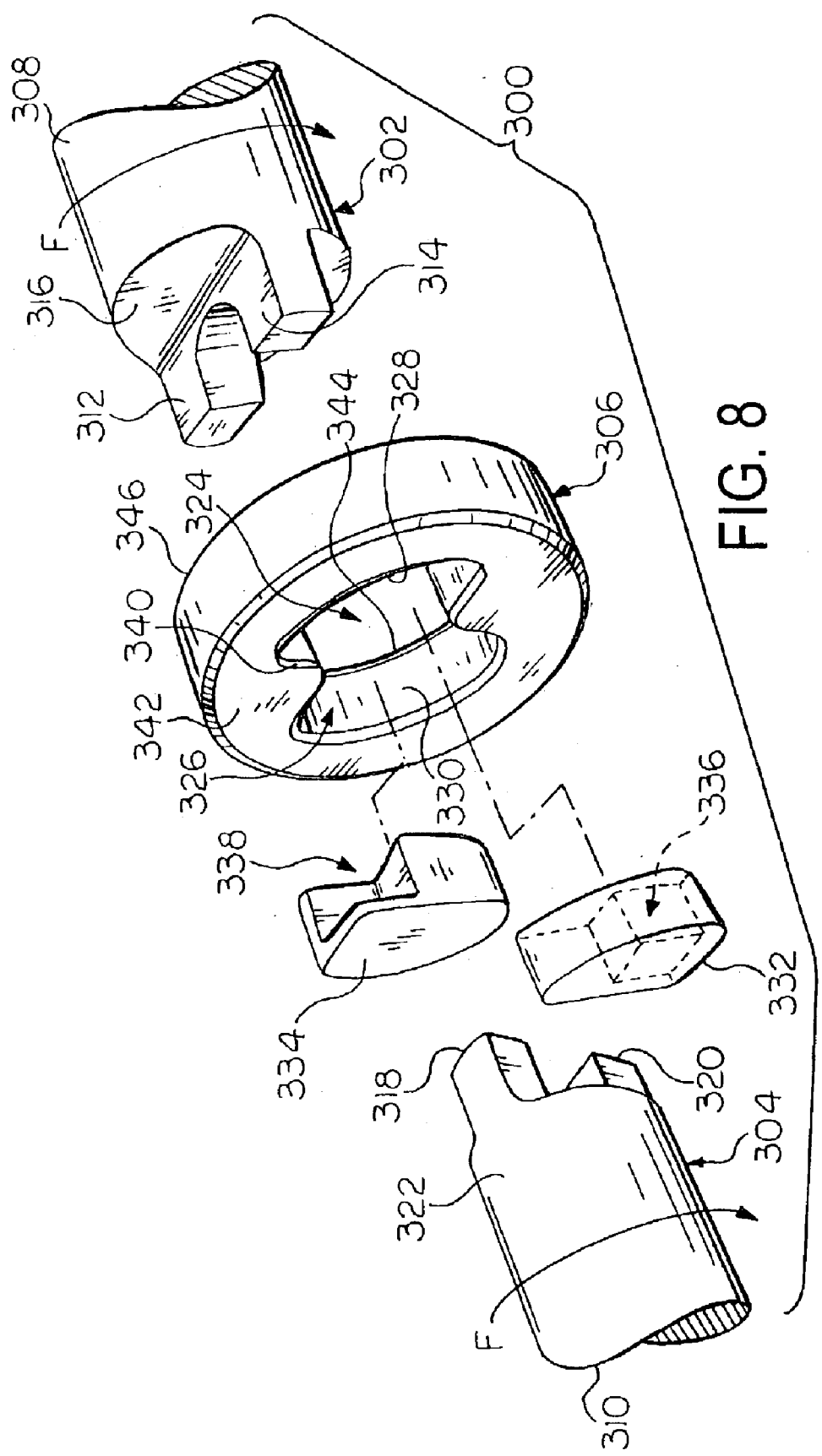
FIG. 8 is an exploded perspective view of a sixth embodiment of the coupling in accordance with the present invention including a driving shaft and a driven shaft, the coupling having cylindrical elastomer inserts with a rectangular cross-section.

Referring now to FIG. 8, there is shown a sixth embodiment of a shaft coupling assembly 300. The shaft coupling assembly 300 includes a driving shaft 302, a driven shaft 304, and a coupling main body 306. A direction of rotation 'F' is shown for both the driving shaft 302 and the driven shaft 304. A first end 308 of the driving shaft 302 is drivingly engaged with a prime mover (not shown) such as a motor, for example. A first end 310 of the driven shaft 304 is drivingly engaged with a rotatable machine (not shown) such as a pump or compressor, for example.

A pair of diametrically opposed tabs 312, 314 extend axially outwardly from a second end 316 of the driving shaft 302. A pair of diametrically opposed tabs 318, 320 extend axially outwardly from a second end 322 of the driven shaft 304. In the embodiment shown the tabs 312, 314, 318, 320 are rectangular in cross-section. It is understood that tabs having different cross-sectional shapes could be used without departing from the scope and spirit of the invention. The tabs 312, 314 of the driving shaft 302 are offset ninety degrees from the tabs 318, 320 of the driven shaft 304 in the embodiment shown. It is understood that tabs having different offset angles could be used without departing from the scope and spirit of the invention.

The coupling main body 306 has an aperture formed therein. The aperture is divided into a first lobe 324 and a second lobe 326. Each lobe 324, 326 has two generally flat surfaces extending radially outwardly from the central portion of the coupling main body 306. The flat portions of the first lobe 324 are joined at a radially outward portion by a curved surface 328. The flat portions of the second lobe 326 are joined at a radially outward portion by a curved surface 330. A first insert 332 is adapted to be received in the first lobe 324. A second insert 334 is adapted to be received in the second lobe 326. The first insert 332 has a pocket 336 formed therein adapted to receive the tab 314 and the second insert 334 has a pocket 338 formed therein adapted to receive the tab 312. Preferably, the first insert 332 and the second insert 334 are produced from an elastomer. However, it is understood that materials having similar mechanical properties can be used. A bevel 340 surrounds the first lobe 324 and the second lobe 326 on a first side 342 of the coupling main body 306. A bevel 344 surrounds the first lobe 324 and the second lobe 326 on a second side 346 of the coupling main body 306.

To assemble, the first insert 332 is inserted into the first lobe 324 and the second insert 334 is inserted into the second lobe 326. A preferred method would be to overmold the second insert 334 over the coupling main body 306. The tab 314 is snugly received in the pocket 336 of the first insert 332 and the tab 312 is snugly received in the pocket 338 of the second insert 334. The tabs 318, 320 of the driven shaft 304 are inserted in the first lobe 324 adjacent the first insert 332 and the second lobe 326 adjacent the second insert 334, respectively. The bevel 340 guides the tabs 312, 314 into the pockets 336, 338. The bevel 344 guides the tabs 318, 320 into the first lobe 324 and the second lobe 326, respectively.

The pockets 336, 338 do not extend fully through the inserts 332, 334, respectively. This prevents the tabs 312, 314, 318, 320 from being inserted incorrectly and ensures that the drive torque is reacted against the coupling main body 306, and not the elastomer inserts 332, 334.

In operation, the driving shaft 302 is caused to rotate by the prime mover, which causes the coupling main body 306, the driven shaft 304, and the rotatable machine to rotate. Due to the snug fit therebetween, the first insert 332 and the second insert 334 urge the tabs 312, 314, 318, 320 and thereby cause the driving shaft 302 and the driven shaft 304 to be preloaded in the non-driven direction. The preloading militates against rotational play between the driving shaft 302, the driven shaft 304, and the coupling main body 306. When compared to conventional coupling assemblies, the shaft coupling assembly 300 of the present invention facilitates a relaxation of manufacturing tolerances for the tabs 312, 314, 318, 320 and the first lobe 324 and the second lobe 326 of the coupling main body 306. The first insert 332 and the second insert 334 also militate against backlashes during slowdown or stopping of the motor.

Figure 9:
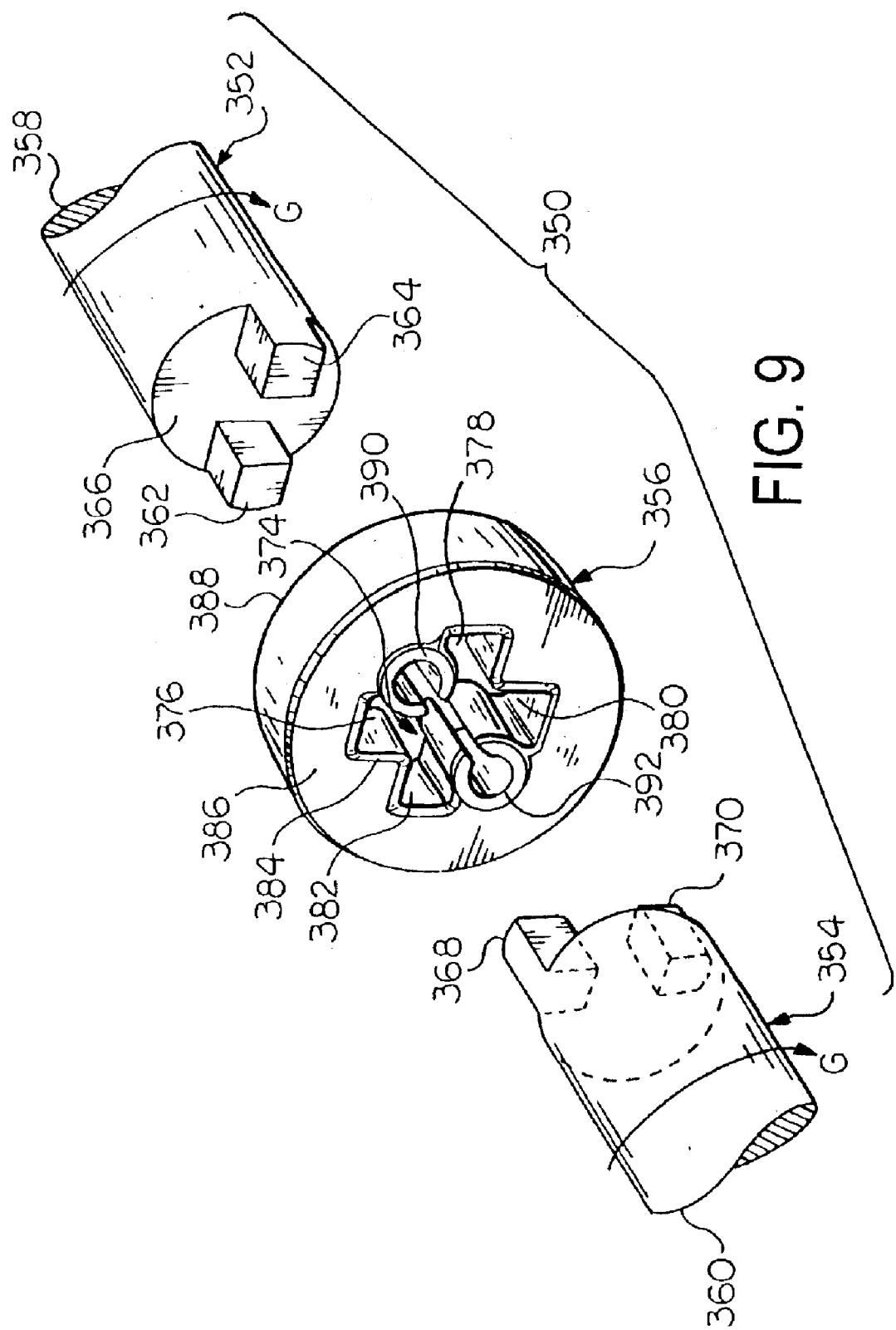
FIG. 9 is an exploded perspective view of a seventh embodiment of the coupling in accordance with the present invention including a driving shaft and a driven shaft, the coupling having inserts with a C-shaped cross-section.

Referring now to FIG. 9, there is shown a seventh embodiment of a shaft coupling assembly 350. The shaft coupling assembly 350 includes a driving shaft 352, a driven shaft 354, and a coupling main body 356. A direction of rotation 'G' is shown for both the driving shaft 352 and the driven shaft 354. A first end 358 of the driving shaft 352 is drivingly engaged with a prime mover (not shown) such as a motor, for example. A first end 360 of the driven shaft 354 is drivingly engaged with a rotatable machine (not shown) such as a pump or compressor, for example.

A pair of diametrically opposed tabs 362, 364 extend axially outwardly from a second end 366 of the driving shaft 352. A pair of diametrically opposed tabs 368, 370 extend axially outwardly from a second end 372 of the driven shaft 354. In the embodiment shown the tabs 362, 364, 368, 370 are rectangular in cross-section. It is understood that tabs having different cross-sectional shapes could be used without departing from the scope and spirit of the invention. The tabs 362, 364 of the driving shaft 352 are offset ninety degrees from the tabs 368, 370 of the driven shaft 354 in the embodiment shown. It is understood that tabs having different offset angles could be used without departing from the scope and spirit of the invention.

The coupling main body 356 includes a central aperture 374 having four outwardly extending lobes 376, 378, 380, 382 forming a cross-shaped aperture. The lobes 378, 382 are adapted to receive the tabs 364, 362, respectively. The lobes 376, 380 are adapted to receive the tabs 368, 370, respectively. A bevel 384 surrounds the lobes 376, 378, 380, 382 adjacent a first surface 386 of the coupling main body 356. Additionally, a bevel (not shown) surrounds the lobes 376, 378, 380, 382 adjacent a second surface 388. An insert 390 having a C-shaped cross section is disposed between the lobe 376 and the lobe 378. An insert 392 having a C-shaped cross section is disposed between the lobe 380 and the lobe 382. It is understood that the inserts 390, 392 could be disposed between the lobes 378, 380 and the lobes 378, 382, respectively. Additionally, although two inserts 390, 392 are shown, it is understood that fewer or more inserts can be used without departing from the scope and spirit of the invention.

To assemble, the tabs 362, 364 of the driving shaft 352 are inserted into the lobes 382, 378, respectfully. The bevel surrounding the lobes 376, 378, 380, 382 adjacent the second surface 388 guides the tabs 362, 364 into the lobes 382, 378. The tabs 368, 370 of the driven shaft 354 are inserted into the lobes 376, 380, respectfully. The bevel 384 guides the tabs 368, 370 into the lobes 376, 380.

In operation, the driving shaft 352 is caused to rotate by the prime mover, which causes the coupling main body 356, the driven shaft 354, and the rotatable machine to rotate. The inserts 390, 392 cause the driving shaft 352 and the driven shaft 354 to be preloaded in the non-driven direction, thereby militating against rotational play between the driving shaft 352, the driven shaft 354, and the coupling main body 356. When compared to conventional coupling assemblies, the shaft coupling assembly 350 of the present invention facilitates a relaxation of manufacturing tolerances for the tabs 362, 364, 368, 370 and the lobes 376, 378, 380, 382 of the coupling main body 356. The inserts 390, 392 also militate against backlashes during slowdown or stopping of the motor.

Referring now to FIG. 10, there is shown an eighth embodiment of a shaft coupling assembly 400. The shaft coupling assembly 400 includes a driving shaft 402, a driven shaft 404, and a coupling main body 406. A preferred direction of rotation 'H' is shown for both the driving shaft 402 and the driven shaft 404. A first end 408 of the driving shaft 402 is drivingly engaged with a prime mover (not shown) such as a motor, for example. A first end 410 of the driven shaft 404 is drivingly engaged with a rotatable machine (not shown) such as a pump or compressor, for example.

A pair of diametrically opposed tabs 412, 414 extend axially outwardly from a second end 416 of the driving shaft 402. A pair of diametrically opposed tabs 418, 420 extend axially outwardly from a second end 422 of the driven shaft 404. In the embodiment shown the tabs 412, 414, 418, 420 are rectangular in cross-section. It is understood that tabs having different cross-sectional shapes could be used without departing from the scope and spirit of the invention. The tabs 412, 414 of the driving shaft 402 are offset ninety degrees from the tabs 418, 420 of the driven shaft 404 in the embodiment shown. It is understood that tabs having different offset angles could be used without departing from the scope and spirit of the invention.

The coupling main body 406 includes a central aperture 424 having four outwardly extending lobes 426, 428, 430, 432 forming a cross-shaped aperture. The lobes 426, 430 receive the tabs 418, 420, respectively. Side walls 434, 436 forming the lobe 426 are helically curved from a first side 438 to a second side 440. Linear contact is made between the edges of the tab 418 and the side walls 434, 436, as clearly shown in FIG. 11. Side walls 442, 444, 446, 448, 450, 452 are also helically curved. It is understood that other configurations for the side walls 434, 436, 442, 444, 446, 448, 450, 452 facilitating linear contact could be used without departing from the scope and spirit of the invention such as tapered, for example. Additionally, it is understood that surface-to-surface contact instead of linear contact could be used with the tapered or curved side walls 434, 436, 442, 444, 446, 448, 450, 452 without departing from the scope and spirit of the invention. A bevel 454 surrounds the aperture 424 adjacent the first side 438 of the coupling main body 406. Additionally, a bevel (not shown) surrounds the aperture 424 adjacent the second side 440 of the coupling main body 406.

To assemble, the tabs 412, 414 of the driving shaft 402 are inserted into the lobes 432, 428, respectfully. The bevel surrounding the aperture 424 adjacent the second side 440 of the coupling main body 406 guides the tabs 412, 414 into the lobes 432, 428, respectively. The tabs 418, 420 of the driven shaft 404 are inserted into the lobes 426, 430, respectfully. The bevel 454 guides the tabs 418, 420 into the lobes 426, 430, respectively.

A bearing system (not shown) maintains an axial load urging the shafts 402, 404 towards each other, or, at a minimum, prevents reaction forces generated during rotation of the shafts 402,404 from moving the shafts 402, 404 apart, so as to maintain contacts between the shafts 402, 404 and the coupling main body 406.

In operation, the driving shaft 402 is caused to rotate by the prime mover, which causes the coupling main body 406, the driven shaft 404, and the rotatable machine to rotate. The helical side walls 434, 436, 442, 444, 446, 448, 450, 452 of the coupling main body 406 militate against rotational play between the driving shaft 402, the driven shaft 404, and the coupling main body 406. The shaft coupling assembly 400 of the present invention facilitates a relaxation of manufacturing tolerances for the tabs 412, 414, 418, 420 and the lobes 426, 428, 430, 432 of the coupling main body 406. The helical side walls 434, 436, 442, 444, 446, 448, 450, 452 also militate against backlashes during slowdown or stopping of the motor. The direction of rotation 'H' shown is a preferred direction because this direction of rotation allows the torque to be transmitted near the base of the tabs 412, 414, 420, 418.

Figure 12:
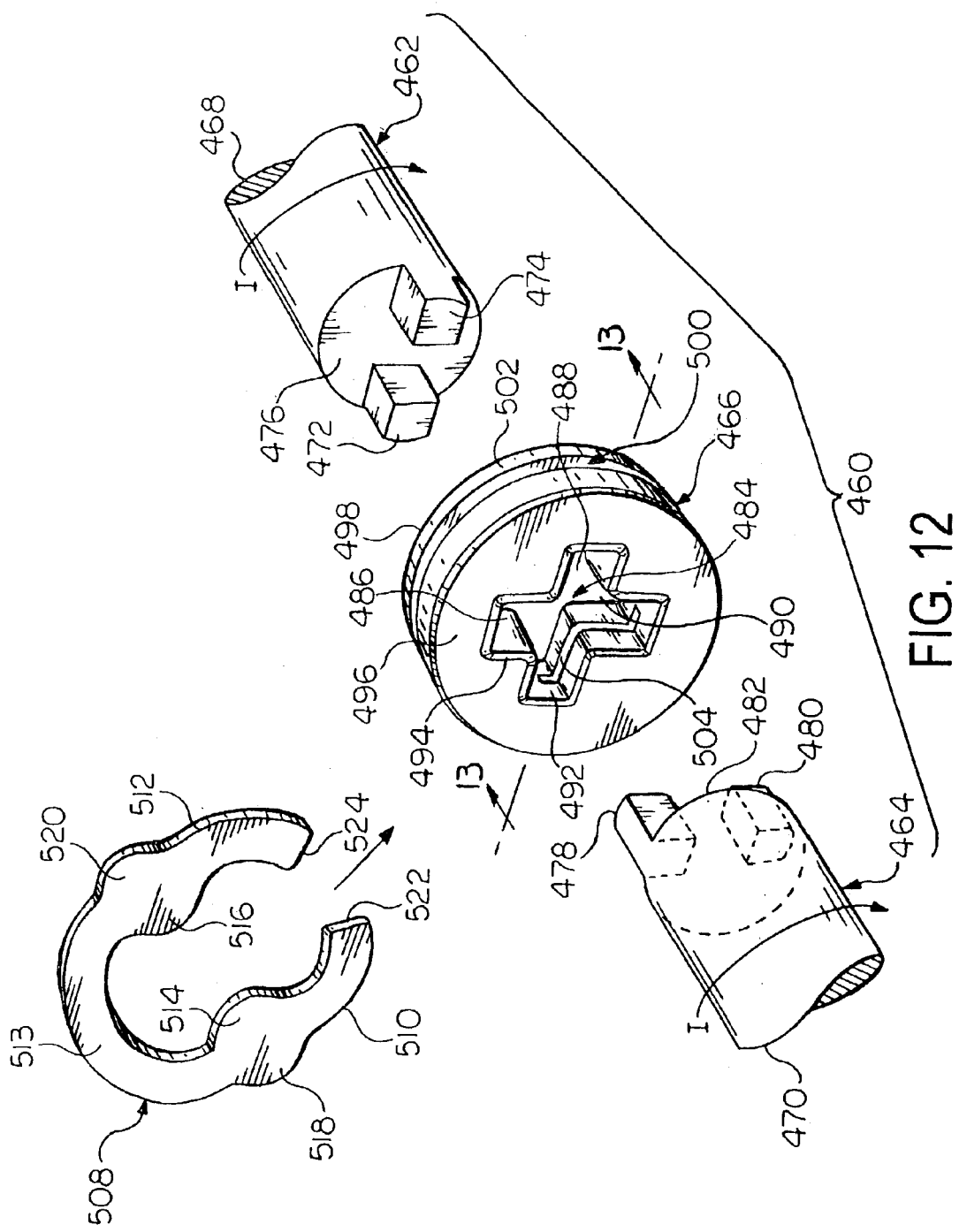
FIG. 12 is an exploded perspective view of a ninth embodiment of the coupling in accordance with the present invention including a driving shaft and a driven shaft, the coupling including a pre-loading clip.

Referring now to FIG. 12, there is shown a ninth embodiment of a shaft coupling assembly 460. The shaft coupling assembly 460 includes a driving shaft 462, a driven shaft 464, and a coupling main body 466. A direction of rotation 'I' is shown for both the driving shaft 462 and the driven shaft 464. A first end 468 of the driving shaft 462 is drivingly engaged with a prime mover (not shown) such as a motor, for example. A first end 470 of the driven shaft 464 is drivingly engaged with a rotatable machine (not shown) such as a pump or compressor, for example.

A pair of diametrically opposed tabs 472, 474 extend axially outwardly from a second end 476 of the driving shaft 462. A pair of diametrically opposed tabs 478, 480 extend axially outwardly from a second end 482 of the driven shaft 464. In the embodiment shown the tabs 472, 474, 478, 480 are rectangular in cross-section. It is understood that tabs having different cross-sectional shapes could be used without departing from the scope and spirit of the invention. The tabs 472, 474 of the driving shaft 462 are offset ninety degrees from the tabs 478, 480 of the driven shaft 464 in the embodiment shown. It is understood that tabs having different offset angles could be used without departing from the scope and spirit of the invention.

The coupling main body 466 includes a central aperture 484 having four outwardly extending lobes 486, 488, 490, 492 forming a cross-shaped aperture. The lobes 488, 492 are adapted to receive the tabs 474, 472, respectively. The lobes 486, 490 are adapted to receive the tabs 478, 480, respectively. A bevel 494 surrounds the lobes 486, 488, 490, 492 adjacent a first surface 496 of the coupling main body 466. Additionally, a bevel (not shown) surrounds the lobes 486, 488, 490, 492 adjacent a second surface 498.

Figure 13:
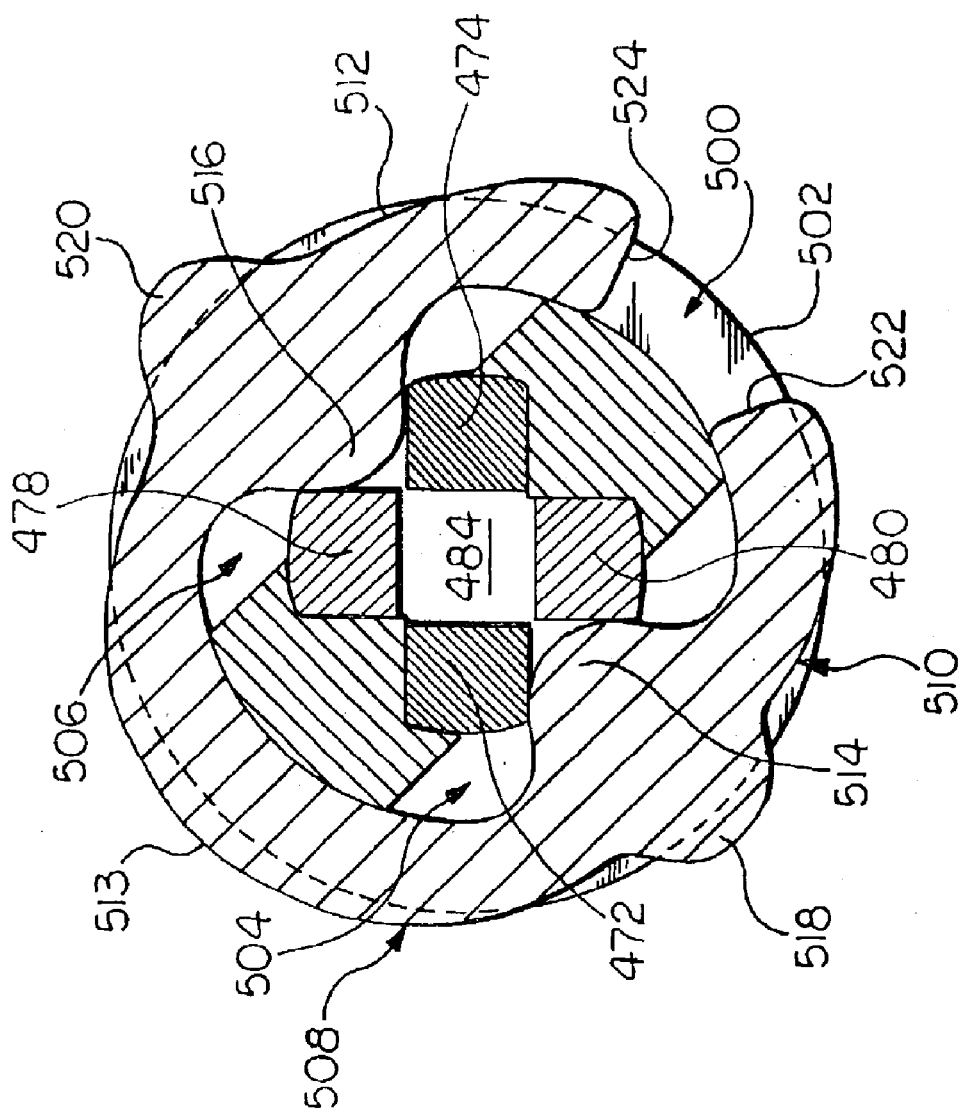
FIG. 13 is a sectional view of the coupling of FIG. 12 taken along line 13—13 and shown with the preload clip in the assembled position.

A circumferential slot 500 is formed in a circumferential outer surface 502 of the coupling main body 466. The depth of the slot 500 is increased on two sides to form two diametrically opposed chord slots 504, 506, as clearly shown in FIG. 13.

A preload clip 508 is adapted to be received in the slot 500 of the coupling main body 466. The preload clip 508 is generally C-shaped with a first arm 510 and a second arm 512 joined by a bridge portion 513. Each arm 510, 512 has an inwardly facing detent 514, 516 and an outwardly facing detent 518, 520 formed thereon. The first arm 510 and the second arm 512 each terminate at an inwardly facing end 522, 524, respectively.

To assemble, the tabs 472, 474 of the driving shaft 462 are inserted into the lobes 492, 488, respectfully. The bevel surrounding the lobes 486, 488, 490, 492 adjacent the second surface 498 guides the tabs 472, 474 into the lobes 492, 488. The tabs 478, 480 of the. driven shaft 464 are inserted into the lobes 486, 490, respectfully. The bevel 494 guides the tabs 478, 480 into the lobes 486, 490. The preload clip 508 is placed in the slot 500 and disposed around the coupling main body 466 in the orientation shown in FIGS. 12 and 13. The end 522 of the first arm 510 and the end 524 of the second arm 512 cooperate to grip the coupling main body 466 and keep the preload clip 508 in place. The detents 514, 516 abut the tabs 472, 474, 478, 480 to preload the driving shaft 462 and the driven shaft 464.

In operation, the driving shaft 462 is caused to rotate by the prime mover, which causes the coupling main body 466, the driven shaft 464, and the rotatable machine to rotate. The preload clip 508 causes the driving shaft 462 and the driven shaft 464 to be preloaded against the main coupling body 466, thereby militating against rotational play between the driving shaft 462, the driven shaft 464, and the coupling main body 466. When compared to conventional coupling assemblies, the shaft coupling assembly 460 of the present invention facilitates a relaxation of manufacturing tolerances for the tabs 472, 474, 478, 480 and the lobes 486, 488, 490, 492 of the coupling main body 466. The preload clip 508 also militates against backlashes during slowdown or stopping of the motor.

Figure 14:
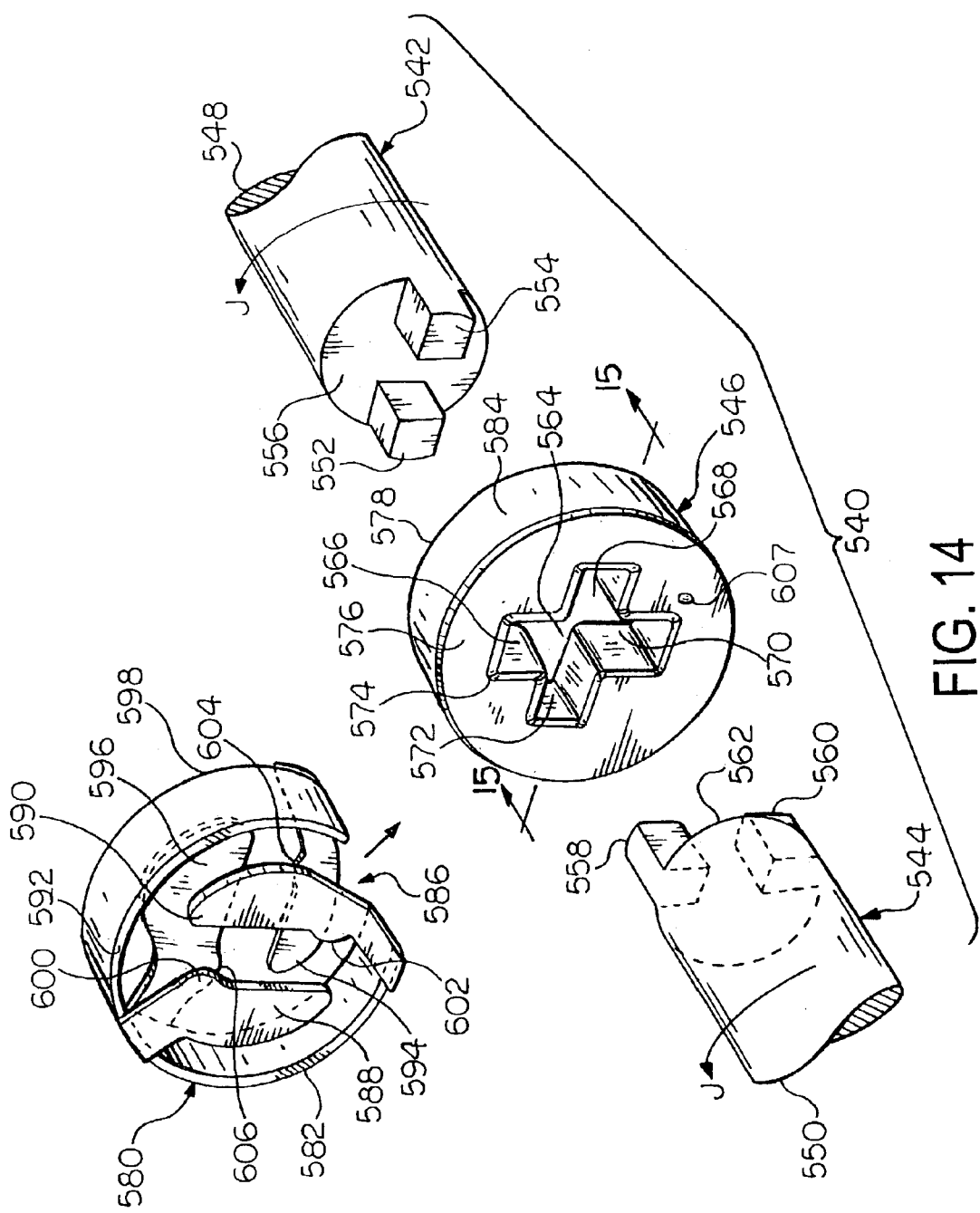
FIG. 14 is an exploded perspective view of a tenth embodiment of the coupling in accordance with the present invention including a driving shaft and a driven shaft, the coupling including a pre-loading clip.

Referring now to FIG. 14, there is shown a tenth embodiment of a shaft coupling assembly 540. The shaft coupling assembly 540 includes a driving shaft 542, a driven shaft 544, and a coupling main body 546. A direction of rotation 'J' is shown for both the driving shaft 542 and the driven shaft 544. A first end 548 of the driving shaft 542 is drivingly engaged with a prime mover (not shown) such as a motor, for example. A first end 550 of the driven shaft 544 is drivingly engaged with a rotatable machine (not shown) such as a pump or compressor, for example.

A pair of diametrically opposed tabs 552, 554 extend axially outwardly from a second end 556 of the driving shaft 542. A pair of diametrically opposed tabs 558, 560 extend axially outwardly from a second end 562 of the driven shaft 544. In the embodiment shown the tabs 552, 554, 558, 560 are rectangular in cross-section. It is understood that tabs having different cross-sectional shapes could be used without departing from the scope and spirit of the invention. The tabs 552, 554 of the driving shaft 542 are offset ninety degrees from the tabs 558, 560 of the driven shaft 544 in the embodiment shown. It is understood that tabs having different offset angles could be used without departing from the scope and spirit of the invention.

The coupling main body 546 includes a central aperture 564 having four outwardly extending lobes 566, 568, 570, 572 forming a cross-shaped aperture. The lobes 568, 572 are adapted to receive the tabs 554, 552, respectively. The lobes 566, 570 are adapted to receive the tabs 558, 560, respectively. A bevel 574 surrounds the lobes 566, 568, 570, 572 adjacent a first surface 576 of the coupling main body 546. Additionally, a bevel (not shown) surrounds the lobes 566, 568, 570, 572 adjacent a second surface 578.

A preload clip 580 is adapted to be disposed around the coupling main body 546. An annular ring 582 is formed to surround an outer surface 584 of the coupling main body 546. The annular ring 582 has an aperture 586 formed therein to facilitate assembly of the preload clip 580 and the coupling main body 546. A pair of arms 588, 590 extend radially inwardly from a first side 592 of the annular ring 582. The arms 588, 590 extend inwardly from diametrically opposed portions of the annular ring 582 and are in a facing relationship to each other. A pair of arms 594, 596 extend radially inwardly from a second side 598 of the annular ring 582. The arms 594, 596 extend inwardly from diametrically opposed portions of the annular ring 582 and are in a facing relationship to each other. Each of the arms 588, 590, 594, 596 has a radially inwardly facing heel portion 600, 602, 604, 606 formed thereon. In the embodiment shown, the preload clip 580 is produced from spring steel in order to facilitate the preload clip 580 returning to its desired form after installation on the coupling main body 546. An indentation 607 is formed in the coupling main body 546. The indentation 607 is adapted to receive a detent (not shown) formed on the preload clip 580. The indentation 607 and the detent cooperate to ensure proper orientation of the preload clip 580 on the coupling main body 546. It is understood that other alignment structures could be used without departing from the scope and spirit of the invention.

Figure 15:
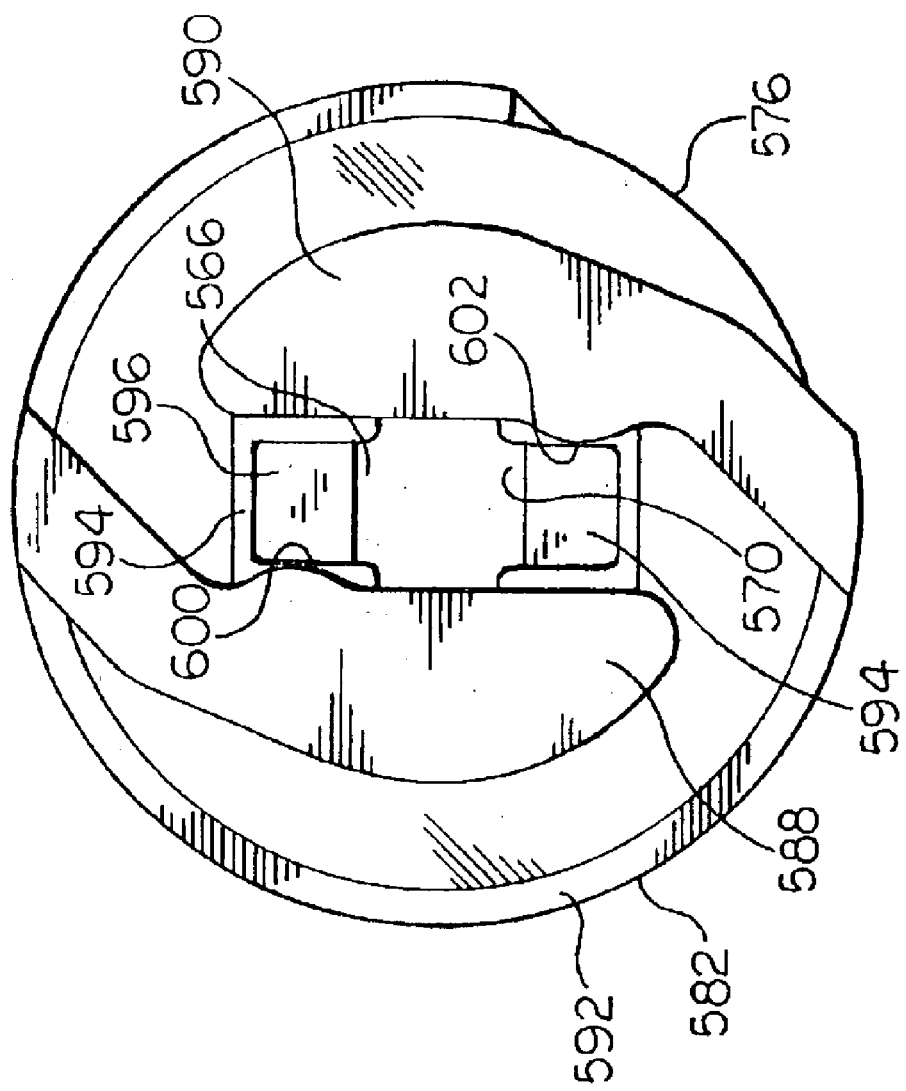
FIG. 15 is a sectional view of the coupling of FIG. 14 taken along line 15—15 and shown with the preload clip in the assembled position.

To assemble, the coupling main body 546 is inserted through the aperture 586 of the annular ring 582 of the preload clip 580. The arms 588, 590 are aligned with the lobes 566, 570 of the coupling main body 546 as clearly shown in FIG. 15. The tabs 552, 554 of the driving shaft 542 are inserted into the lobes 572, 568, respectfully. The bevel surrounding the lobes 566, 568, 570, 572 adjacent the second surface 578 guides the tabs 552, 554 into the lobes 572, 568. The tabs 558, 560 of the driven shaft 544 are inserted into the lobes 566, 570, respectfully. The bevel 574 guides the tabs 558, 560 into the lobes 566, 570. Portions of the arms 588, 590, 594, 596 extend over the lobes 572, 568, 570, 566, respectively, preventing incorrect assembly from tabs 552, 554 being in line with 558, 560 rather than at 90 degrees to one another.

In operation, the driving shaft 542 is caused to rotate by the prime mover, which causes the coupling main body 546, the driven shaft 544, and the rotatable machine to rotate. The heels 604, 606 cause the driving shaft 542 to be preloaded in the non-driven direction, and the heels 600, 602 cause the driven shaft 544 to be preloaded in the non-driven direction. Thus, the heels 600, 602, 604, 606 of the preload clip 580 militate against rotational play between the driving shaft 542, the driven shaft 544, and the coupling main body 546. When compared to conventional coupling assemblies, the shaft coupling assembly 540 of the present invention facilitates a relaxation of manufacturing tolerances for the tabs 552, 554, 558, 560 and the lobes 566, 568, 570, 572. The preload clip 580 also militates against backlashes during slowdown or stopping of the motor.

Figure 16:
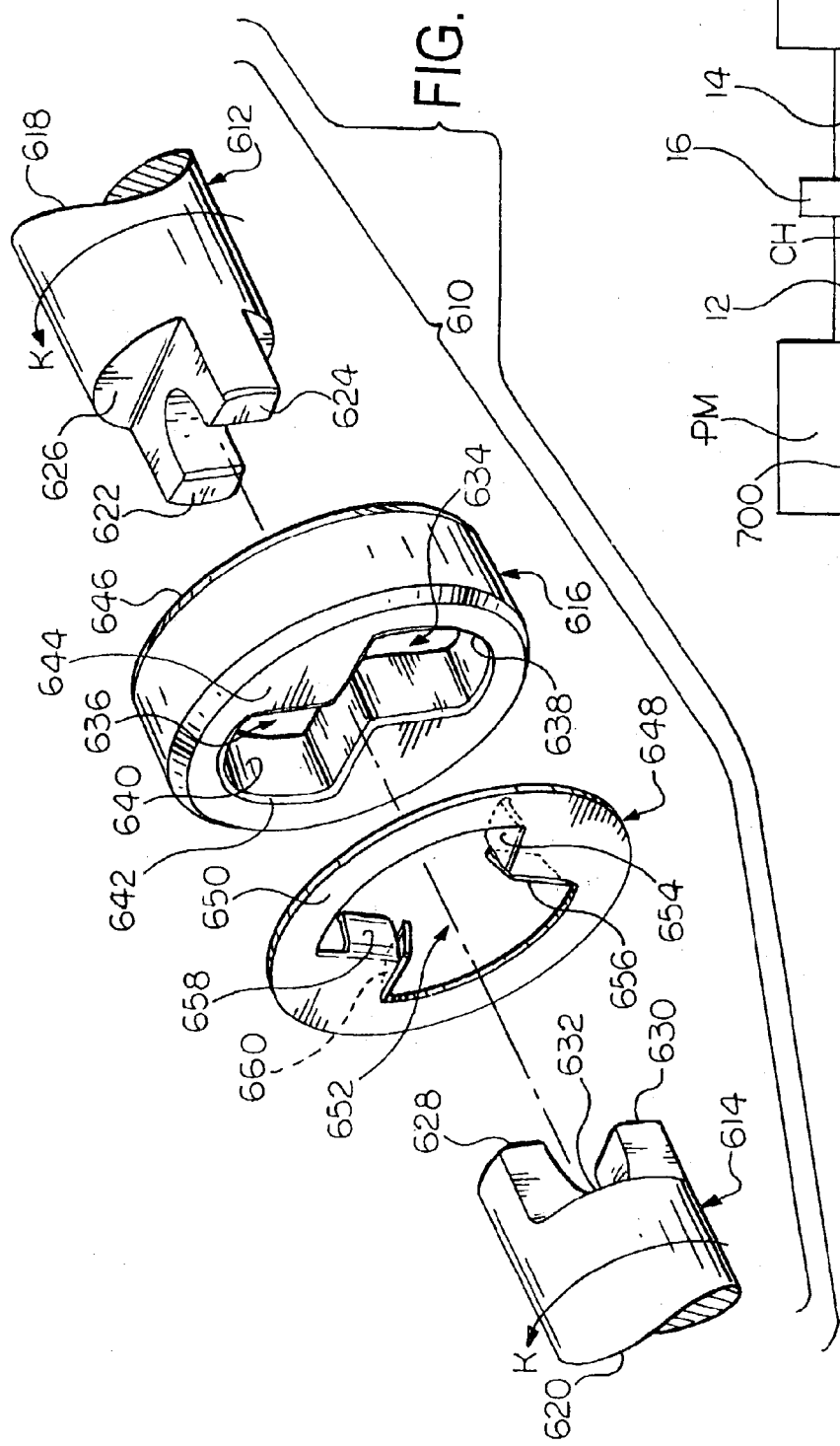
FIG. 16 is an exploded perspective view of an eleventh embodiment of the coupling in accordance with the present invention including a drive shaft and a driven shaft, the coupling including a preloading plate.

Referring now to FIG. 16, there is shown an eleventh embodiment of a shaft coupling assembly 610. The shaft coupling assembly 610 includes a driving shaft 612, a driven shaft 614, and a coupling main body 616. A direction of rotation 'K' is shown for both the driving shaft 612 and the driven shaft 614. A first end 618 of the driving shaft 612 is drivingly engaged with a prime mover (not shown) such as a motor, for example. A first end 620 of the driven shaft 614 is drivingly engaged with a rotatable machine (not shown) such as a pump or compressor, for example.

A pair of diametrically opposed tabs 622, 624 extend axially outwardly from a second end 626 of the driving shaft 612. A pair of diametrically opposed tabs 628, 630 extend axially outwardly from a second end 632 of the driven shaft 614. In the embodiment shown, the tabs 622, 624, 628, 630 are rectangular in cross-section. It is understood that tabs having different cross-sectional shapes could be used without departing from the scope and spirit of the invention. The tabs 622, 624 of the driving shaft 612 are offset ninety degrees from the tabs 628, 630 of the driven shaft 614 in the embodiment shown. It is understood that tabs having different offset angles could be used without departing from the scope and spirit of the invention.

The coupling main body 616 has an aperture formed therein. The aperture is divided into a first lobe 634 and a second lobe 636. Each lobe 634, 636 has two generally flat surfaces extending radially outwardly from the central portion of the coupling main body 616. The flat portions of the first lobe 634 are joined at a radially outward portion by a curved surface 638. The flat portions of the second lobe 636 are joined at a radially outward portion by a curved surface 640. A bevel 642 surrounds the lobes 634, 636 adjacent a first surface 644 of the coupling main body 616. Additionally, a bevel (not shown) surrounds the lobes 634, 636 adjacent a second surface 646 of the coupling main body 616.

A preload clip 648 is adapted to be received by the coupling main body 616. The preload clip 648 includes an annular ring 650 surrounding a central aperture 652. A portion on the annular ring 650 has a first pair of arms or urging members 654, 656 disposed thereon. A second pair of arms or urging members 658, 660 is disposed on a diametrically opposed portion of the annular ring 650. The arms 654, 656, 658, 660 extend in a generally axial direction in respect of the driving shaft 612 and the driven shaft 614.

To assemble, the preload clip 648 is placed adjacent the coupling main body 616 with the arms 654, 656 extending into second lobe 636 and the arms 658, 660 extending into the first lobe 634. The tabs 622, 624 of the driving shaft 612 are inserted into the lobes 636, 634, respectfully. The bevel surrounding the lobes 636, 634 adjacent the second surface 646 guides the tabs 622, 624 into the lobes 636, 634. The tabs 628, 630 of the driven shaft 614 are inserted into the lobes 636, 634, respectfully. The bevel 642 guides the tabs 628, 630 into the lobes 636, 634. The arm 660 abuts the tab 622, the arm 654 abuts the tab 624, the arm 658 abuts the tab 628, and the arm 656 abuts the tab 630.

In operation, the driving shaft 612 is caused to rotate by the prime mover, which causes the coupling main body 616, the driven shaft 614, and the rotatable machine to rotate. The arms 654, 660 cause the driving shaft 612 to be preloaded in the non-driven direction, and the arms 656, 658 cause the driven shaft 614 to be preloaded in the non-driven direction. Thus, the arms 654, 656, 658, 660 of the preload clip 648 militate against rotational play between the driving shaft 612, the driven shaft 614, and the coupling main body 616. When compared to conventional coupling assemblies, the shaft coupling assembly 610 of the present invention facilitates a relaxation of manufacturing tolerances for the tabs 622, 624, 628, 630 and the lobes 634, 636. The preload clip 648 also militates against backlashes during slowdown or stopping of the motor.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A shaft coupling assembly comprising:
   a driving shaft having a longitudinal axis, a first end, and a second end, the first end adapted to be driven by a prime mover and the second end having a pair of tabs extending axially outwardly therefrom;
   a driven shaft having a longitudinal axis, a first end, and a second end, the first end adapted for connection to a rotating machine and the second end having a pair of tabs extending axially outwardly therefrom; and
   a coupling main body having a central aperture formed therein, the aperture adapted to receive the tabs of said driving shaft and the tabs of said driven shaft in opposing sides thereof to transfer rotation from said driving shaft to said driven shaft;
   wherein at least one of the tabs of said driving shaft and the tabs of said driven shaft has a surface that is tapered and in contact with said coupling main body.

2. The coupling assembly according to claim 1, including a bearing system adapted to resist reaction forces generated during rotation of said driving shaft and said driven shaft to maintain engagement between said driving shaft, said driven shaft, and said coupling main body.

3. The coupling assembly according to claim 2, wherein the bearing system includes a first bearing disposed on said driving shaft, a second bearing disposed on said driven shaft, and a spring urging at least one of the first bearing and the second bearing, wherein the first bearing, the second bearing, and the spring cooperate to urge said driving shaft and said driven shaft into engagement with said main body to compensate for wear of said driving shaft, said driven shaft, and said main body.

4. The coupling assembly according to claim 1, wherein the side of the tab of said driving shaft and the side of the tab of said driven shaft facing away from a direction of rotation of said driving shaft and said driven shaft are tapered.

5. The coupling assembly according to claim 1, wherein the aperture includes four lobes formed by an inner wall of said main body, each of the lobes of the aperture adapted to receive at least one of the tabs of said driving shaft and said driven shaft therein.

6. The coupling assembly according to claim 5, wherein at least one wall forming the lobes of the aperture is sloped to receive the at least one sloped side of the tabs of said driving shaft and the at least one side of the tabs of said driven shaft.

7. The coupling assembly according to claim 5, wherein the lobes of the aperture which receive the tabs of said driven shaft are shaped to militate against insertion of the tabs of said driving shaft therein.

8. The coupling assembly according to claim 5, wherein the lobes of the aperture which receive the tabs of said driving shaft are shaped to militate against insertion of the tabs of said driven shaft therein.

9. The coupling assembly according to claim 5, wherein a surface of each tab of said driving shaft in a driven direction is tapered and a surface of each tab of said driving shaft in a non-driven direction is tapered.

10. The coupling assembly according to claim 9, wherein a surface of each tab of said driven shaft in the driven direction is tapered and a surface of each tab of said driven shaft in the non-driven direction is tapered.

11. The coupling assembly according to claim 10, wherein the tabs of said driving shaft make linear contact with the inner wall of said main body and the tabs of said driven shaft make linear contact with the inner wall of said main body.

12. The coupling assembly according to claim 11, wherein said main body has a first side adjacent said driven shaft and a second side adjacent said driving shaft, the tabs of said driving shaft contacting the inner wall of said main body closer to the first side than the second side, and the tabs of said driven shaft contacting the inner wall of said main body closer to the second side than the first side, thereby facilitating rotational stability.

13. The coupling assembly according to claim 10, wherein the wall forming the lobes of the aperture has a taper to match the taper of the tabs of said driving shaft and the tabs of said driven shaft.

14. The coupling assembly according to claim 13, wherein the tabs of said driving shaft make surface-to-surface contact with the inner wall of said main body and the tabs of said driven shaft make surface-to-surface contact with the inner wall of said main body.

15. The coupling assembly according to claim 1, wherein the taper of the at least one side of the tabs of said driving shaft is at an angle of between one degree and twenty degrees with respect to the longitudinal axis of said driving shaft, and the taper of the at least one side of the tabs of said driven shaft is at an angle of between one degree and twenty degrees with respect to the longitudinal axis of said driven shaft.

16. The coupling assembly according to claim 1, wherein the taper of the at least one side of the tabs of said driving shaft is at an angle of five degrees with respect to the longitudinal axis of said driving shaft and the taper of the at least one side of the tabs of said driven shaft is at an angle of five degrees with respect to the longitudinal axis of said driven shaft.

17. A shaft coupling assembly comprising:
   a driving shaft having a longitudinal axis, a first end, and a second end, the first end adapted to be driven by a prime mover and the second end having a pair of tabs extending axially outwardly therefrom, wherein a pair of opposing surfaces of each tab are tapered in the axial direction;
   a driven shaft having a longitudinal axis, a first end, and a second end, the first end adapted for connection to a rotating machine and the second end having a pair of tabs extending axially outwardly therefrom, wherein a pair of opposing surfaces of each tab are tapered in the axial direction; and
   a coupling main body having a first side, a second side, and a central aperture formed therein, the aperture having four lobes formed by an inner wall of said main body, two of the lobes of the aperture adapted to receive the tabs of said driven shaft on the first side of the main body, and two of the lobes of the aperture adapted to receive the tabs of the driving shaft on the second side of the main body, said main body facilitating the transfer of rotation from said driving shaft to said driven shaft.

18. The coupling assembly according to claim 17, wherein the tabs of said driving shaft make linear contact with the inner wall of said main body and the tabs of said driven shaft make linear contact with the inner wall of said main body.

19. The coupling assembly according to claim 18, wherein the tabs of said driving shaft contact the inner wall of said main body closer to the first side than the second side, and the tabs of said driven shaft contact the inner wall of said main body closer to the second side than the first side, thereby facilitating rotational stability.

20. The coupling assembly according to claim 17, wherein the wall forming the lobes of the aperture has a taper to match the taper of the tabs of said driving shaft and the tabs of said driven shaft.

21. The coupling assembly according to claim 20, wherein the tabs of said driving shaft make surface-to-surface contact with the inner wall of said main body and the tabs of said driven shaft make surface-to-surface contact with the inner wall of said main body.

22. The coupling assembly according to claim 17, wherein the lobes of the aperture which receive the tabs of said driven shaft are shaped to militate against insertion of the tabs of said driving shaft therein.

23. The coupling assembly according to claim 17, wherein the taper of the tabs of said driving shaft is at an angle of between one degree and twenty degrees with respect to the longitudinal axis of said driving shaft, and the taper of the tabs of said driven shaft is at an angle of between one degree and twenty degrees with respect to the longitudinal axis of said driven shaft.

24. The coupling assembly according to claim 17, wherein the taper of the tabs of said driving shaft is at an angle of five degrees with respect to the longitudinal axis of said driving shaft and the taper of the at least one side of the tabs of said driven shaft is at an angle of five degrees with respect to the longitudinal axis of said driven shaft.

25. A shaft coupling assembly comprising:

a driving shaft having a longitudinal axis, a first end, and a second end, the first end adapted to be driven by a prime mover and the second end having a pair of tabs extending axially outwardly therefrom;

a driven shaft having a longitudinal axis, a first end, and a second end, the first end adapted for connection to a rotating machine and the second end having a pair of tabs extending axially outwardly therefrom; and a coupling main body having a first side, a second side, and a central aperture formed therein, the aperture having four lobes formed by an inner wall of said main body, two of the lobes of the aperture are adapted to receive the tabs of said driven shaft on the first side of the main body, and two of the lobes of the aperture are adapted to receive the tabs of the driving shaft on the second side of the main body, said main body facilitating the transfer of rotation from said driving shaft to said driven shaft;

wherein the wall forming the lobes of the aperture of said main body is tapered from the first side to the second side of said main body.

\* \* \* \* \*